United States Patent
Arai et al.

(10) Patent No.: US 7,293,537 B2
(45) Date of Patent: Nov. 13, 2007

(54) VARIABLE VALVE MECHANISM CONTROL DEVICE AND CONTROL METHOD

(75) Inventors: Masahiro Arai, Yokohama (JP); Tsuneyasu Nohara, Fujisawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 127 days.

(21) Appl. No.: 11/295,170

(22) Filed: Dec. 6, 2005

(65) Prior Publication Data

US 2006/0130787 A1  Jun. 22, 2006

(30) Foreign Application Priority Data

Dec. 6, 2004 (JP) ............... 2004-352510

(51) Int. Cl.
*F01L 1/34* (2006.01)

(52) U.S. Cl. ............... 123/90.16; 123/90.17; 123/90.15; 123/90.31

(58) Field of Classification Search ............ 123/90.16
See application file for complete search history.

(56) References Cited

U.S. PATENT DOCUMENTS

| | | | |
|---|---|---|---|
| 6,575,128 B2 * | 6/2003 | Nakamura et al. | 123/90.16 |
| 6,843,226 B2 | 1/2005 | Miura | |
| 7,077,085 B2 * | 7/2006 | Arai et al. | 123/90.16 |
| 7,107,951 B2 * | 9/2006 | Urushihata et al. | 123/90.17 |

* cited by examiner

*Primary Examiner*—Thomas Denion
*Assistant Examiner*—Kyle M. Riddle
(74) *Attorney, Agent, or Firm*—Young Basile Hanlon MacFarlane & Helmholdt, P.C.

(57) ABSTRACT

With a variable valve timing system, engine operability may be lost when performing open control of lift characteristic amounts to the minimum or the maximum of a variable range when a sensor error occurs. The present invention provides a lift operation angle changing mechanism that can continuously change intake valve lift amount and operation angle within a prescribed variable range. A target operation angle is calculated based on the number of engine revolutions and the accelerator pedal opening APO. An error is determined for the operation angle sensor that detects the actual operation angle. A normal control amount is calculated based on the target operation angle and the actual operation angle, and a failure control amount is calculated based on the number of engine revolutions. Therefore, an intermediate value within the variable range can be obtained as the failure control amount. The normal control amount is output to actuator 51 under normal operation, and the failure control amount is output to actuator 51 when an error occurs.

23 Claims, 24 Drawing Sheets

VARIABLE VALVE MECHANISM CONTROL DEVICE AND CONTROL METHOD

CROSS-REFERENCE TO RELATED APPLICATIONS

The present application claims priority under 35 U.S.C. § 119 of Japanese Patent Application No. 2004-352510, filed on Dec. 6, 2004, the entire content of which is expressly incorporated by reference herein.

TECHNICAL FIELD OF THE INVENTION

The present invention pertains to a control device and control method for a variable valve mechanism which, within a specified variable range, can continuously change the lift characteristic amounts for an internal combustion engine ("engine") intake valve or exhaust valve (hereafter "intake/exhaust valve"), such as the valve lift amount/operation angle, the valve timing, etc.

BACKGROUND

In the field of internal combustion engines for automobiles, a variety of variable valve mechanisms have conventionally been proposed, with changeable lift characteristic amounts such as the intake/exhaust valve lift amount, operation angle, and valve timing. Additional background on variable valve timing is described in Unexamined Japanese Patent Application Publication No. 2002-54466 and in U.S. Pat. No. 6,843,226, titled "Intake control apparatus for internal combustion engine," issued on Jan. 18, 2005, both of which are commonly assigned.

Feedback control is preferably performed based on the detected value of lift characteristic amounts to maintain lift characteristic amounts at their target values with good precision. As described in said Unexamined Japanese Patent Application Publication No. 2002-54466, such feedback control technology is commonly known. Simply explained, target values for the lift characteristic amounts are calculated according to the engine operating conditions (load, number of revolutions, etc.), detection values equivalent to the actual lift characteristic amount values are obtained using an appropriate sensor, and the command value for the variable valve mechanism actuator is calculated based on the deviation of these target values and detection values.

However, if feedback control is continued during a sensor error when the detection values cannot be accurately obtained due to sensor failure or error, the actual lift characteristic amount can be vastly different from the target value, and the risk of losing engine operability occurs. Therefore, in said Unexamined Japanese Patent Application Publication No. 2002-54466, when a sensor error occurs, the system switches to an open control toward the maximum or minimum side of the variable range for the lift characteristic amounts.

SUMMARY

However, when the lift control amount variable range is further expanded for further improvement of mileage and output, operation angle minimum value 40 may become extremely small as shown in FIG. 21. Also, as shown in FIG. 22, operation angle maximum value 41 may become extremely large, causing an excess of residual gas within the cylinders.

The present invention was accomplished in light of these problems, with the main purpose of improving engine operability when an error occurs and good lift characteristic amount detection values cannot be obtained, and therefore control cannot be performed based on these detection values (feedback control).

The present invention has a variable valve mechanism which can continuously change internal combustion engine intake valve or exhaust valve lift characteristic amounts within a specified variable range, an actuator which drives said variable valve mechanism, and a detecting means for obtaining detection values for said lift characteristic amounts. Said lift characteristic amount target values are calculated based on the engine operating conditions, errors of said detecting means are determined, and when said detecting means is normal, a first command value for said lift characteristic amounts is calculated based on said target value and said detection value, and this first command value is output to the actuator. In contrast, when the detecting means is abnormal, a lift characteristic amount second command value is set within a range including middle values in said variable range, and this second command value is output to the actuator.

When the detecting means is abnormal, the second command value selected from a range including middle values in the variable range is output to the actuator, enabling operation using mid-range values for the lift characteristic amounts. Therefore, engine operability during an error can be improved, compared to said conventional example in which lift characteristic amounts are maintained during an error at a maximum value or minimum value corresponding to a mechanical connector position.

EXPLANATION OF THE REFERENCE SYMBOLS

Figure 1:
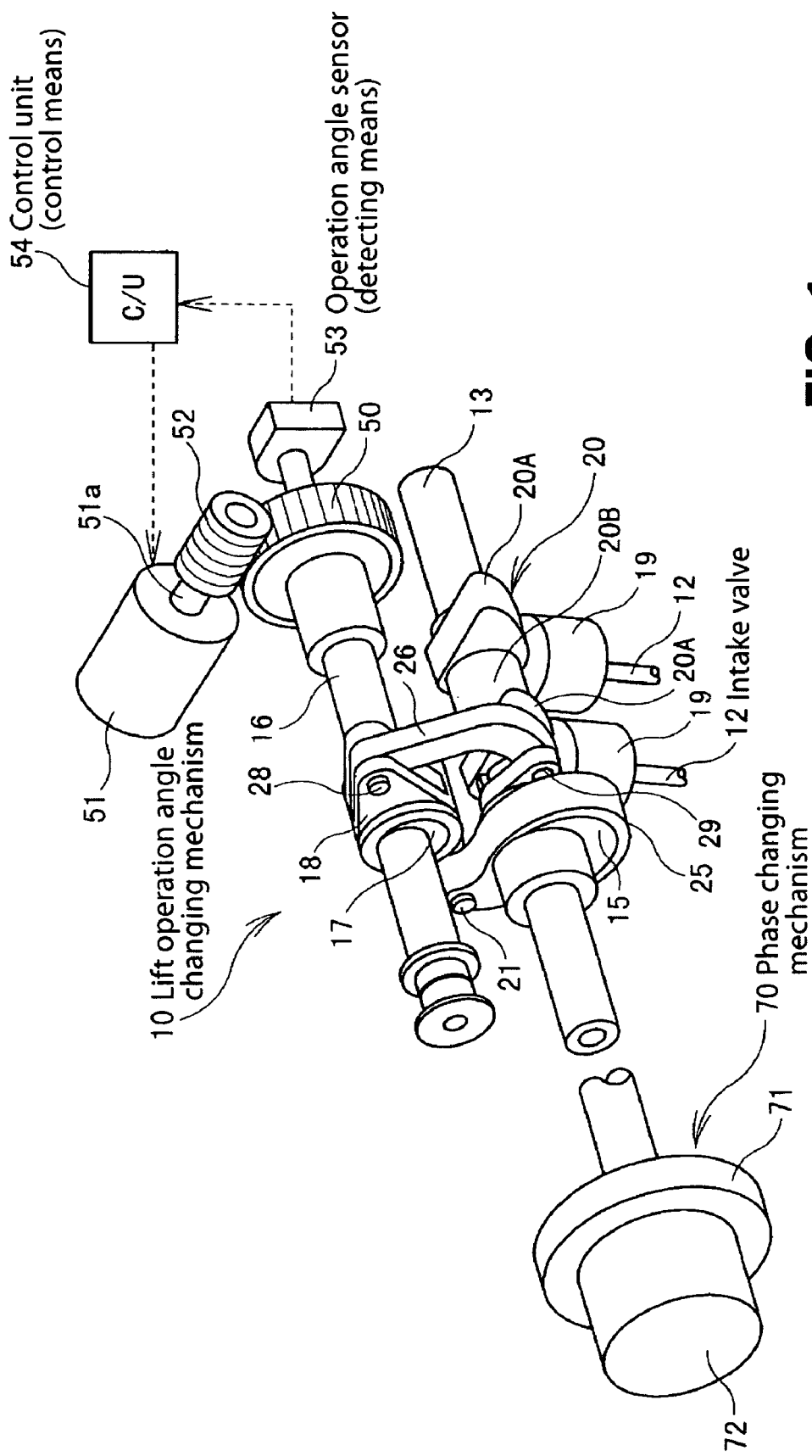
FIG. 1 is a simplified perspective drawing showing a lift operation angle changing mechanism, which is one example of the variable valve mechanism pertaining to the present invention.

10 Lift operation angle changing mechanism (variable valve mechanism)
12 Intake valve
13 Drive shaft
15 Eccentric cam
16 Control shaft
17 Control cam
18 Rocker arm
20 Rocking cam
25 Ring-shaped link (first link)
26 Rod-shaped link (second link)
51 Motor (actuator)
53 Operation angle sensor (detecting means)

DETAILED DESCRIPTION

Hereafter, preferred embodiments for the present invention are described in detail with reference to the Figures. As a variable valve mechanism pertaining to the present invention, FIG. 1 shows lift operation angle changing mechanism 10, in which both the operation angle and the valve lift amount (maximum lift amount) of intake valve 12 can be continuously changed, and phase changing mechanism 70, which can continuously change the valve timing (open/close timing) of intake valve 12. These mechanisms 10 and 70 are already commonly known as described in Unexamined Patent Application Publication No. 2002-54466, so only an overview is described here. One pair of intake valves 12 is provided for each cylinder, and a valve lifter 19 is provided at the top portion of each intake valve 12. Above these valve lifters 19, hollow drive shaft 13 with a lubricating oil path formed in its interior is located along the cylinder row direction. Rotation motive power is transmitted to drive shaft 13 from a crankshaft via phase changing mechanism 70, and drive shaft 13 is rotatably driven to link with the crankshaft. On drive shaft 13 a rocking cam 20 is externally fitted onto each cylinder such that rocking is possible. Each rocking cam 20 has a cam portion 20A contacting the top surface of respective valve lifters 19 on each cylinder. By rocking these rocking cams 20, intake valves 12 rise, that is, lift via cam portions 20A and valve lifters 19.

Operation angle changing mechanism 10 is eccentrically provided on the outer perimeter of drive shaft 13, and has eccentric cam 15 rotating as one unit with drive shaft 13, control shaft 16 located along the cylinder row direction approximately parallel to drive shaft 13, control cam 17 provided eccentrically on the outer perimeter of control shaft 16 and rotating as one unit with this control shaft 16, rocker arm 18 externally fitted on the outer perimeter surface to form the cylinder surface of control cam 17 such that rocking is possible, ring-shaped link (first link) 25 linking one end of rocker arm 18 to eccentric cam 15, and rod-shaped link (second link) 26 linking the other end of rocker arm 18 to rocking cam 20. One end of ring-shaped link 25 is externally fitted onto the outer perimeter surface to form the cylinder surface of eccentric cam 15 such that relative rotation is possible, and the other end is connected to one end of rocker arm 18 via first connecting pin 21 such that relative rotation is possible. One end of rod-shaped link 26 is connected via second pin 28 to the other end of rocker arm 18 such that relative rotation is possible, and the other end is connected via third pin 29 to one cam portion 20A such that relative rotation is possible. The axial center of eccentric cam 15 is eccentric to the axial center of drive shaft 13 by a specified amount, and the axial center of control cam 17 is eccentric to the axial center of control shaft 16 by a specified amount. Journal portion 20B of rocking cam 20 and control shaft 16 are rotatably supported by a cylinder head via a bearing bracket not pictured. Control shaft 16 is rotatably driven by motor 51, which serves as an actuator, and is held in a specified rotation position. In the present embodiment, worm gear 52, provided on output shaft 51a of motor 51, is a simple structure that directly meshes with worm gear wheel 50 fixed coaxially to one end of control shaft 16.

With this composition, when drive shaft 13 interlocks with the crankshaft and rotates, ring-shaped link 25 moves nearly parallel via eccentric cam 15, rocker arm 18 rocks around the axial center of control cam 17, and rocking cam 20 rocks via rod-shaped link 26 causing intake valve 12 to rise. In addition, varying the rotation angle of control shaft 16 will also change the axial center position of control cam 17, which is the rocking center of rod-shaped link 26, which will in turn change the posture of rocking cam 20. Thus, the center phase (phase of open/close timing) of the operation angle of intake valve 12 relative to the drive shaft stays generally stable, while the operation angle of intake valve 12 (intake valve open/close timing) and the valve lift amount continually vary.

This type of operation angle changing mechanism 10 is easily lubricated, has superior durability and reliability and resistance to changing the operation angle is suppressed to a minimum because it has surface contact with the bearing portions for eccentric cam 15, control cam 17 as well as each pin. Also, because rocking cam 20 for driving intake valve 12 is placed coaxially with drive shaft 13, compared to a composition in which the driving cam is supported with a shaft that is different from drive shaft 13, there is superior control precision, the device itself is compact, and vehicle mounting ability is good. Furthermore, since rod-shaped link 26 is placed so that it almost aligns with the upper and lower direction of the engine, the amount of extension to the side of the engine (left and right direction in FIG. 1) is suppressed. In addition, there is little loss because the link mechanism is simple and does not use a spring or other energizing means in the transmission route from drive shaft 13 to rocking cam 20, resulting in superior reliability and durability.

For phase changing mechanism 70, a rotation force from the crankshaft is transmitted via a timing belt not pictured to provide relative rotation of drive shaft 13 and cam pulley 71, which is rotatably linked with the crankshaft and the center phase of the operation angle of intake valve 12, which is the valve timing, is continuously changed in relation to the crankshaft. Inside of housing 72 that rotates as one unit with cam pulley 71 are installed a commonly known vane or spline mechanism and a hydraulic circuit for rotatably driving the drive shaft in the advance-angle or lag-angle directions.

Control unit 54 has a function to memorize and execute various engine control processes including the control process described below, based on the input of detected signals, such as the engine revolution signal, engine load signal, cooling water temperature signal, and operating oil temperature signal. The angle of control shaft 16 corresponding to the lift characteristic amounts (valve lift amount and operating angle) of lift operation angle changing mechanism 10 is detected by a potentiometer, such as operation angle sensor (control shaft sensor) 53.

Figure 2:
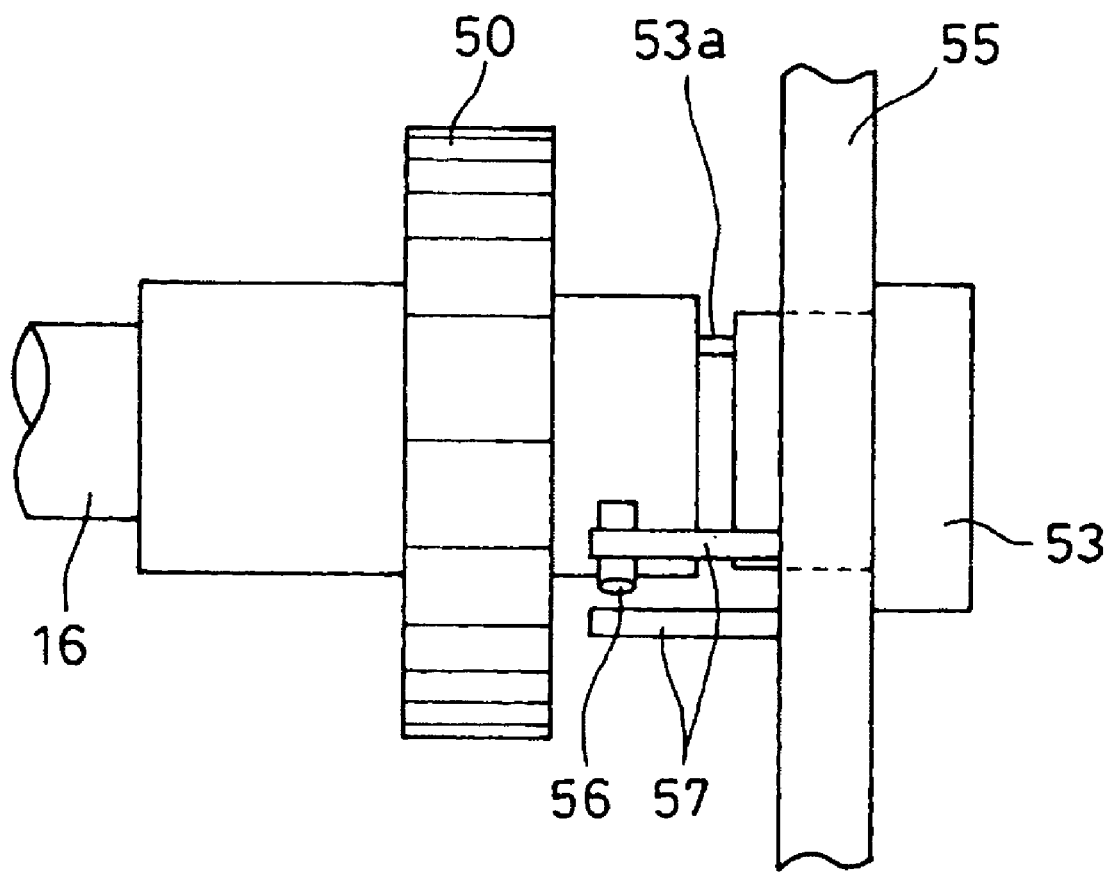
FIG. 2 is a side view showing the pin and stopper that regulate the movable range for the control shaft in said lift operation angle changing mechanism.
Figure 3:
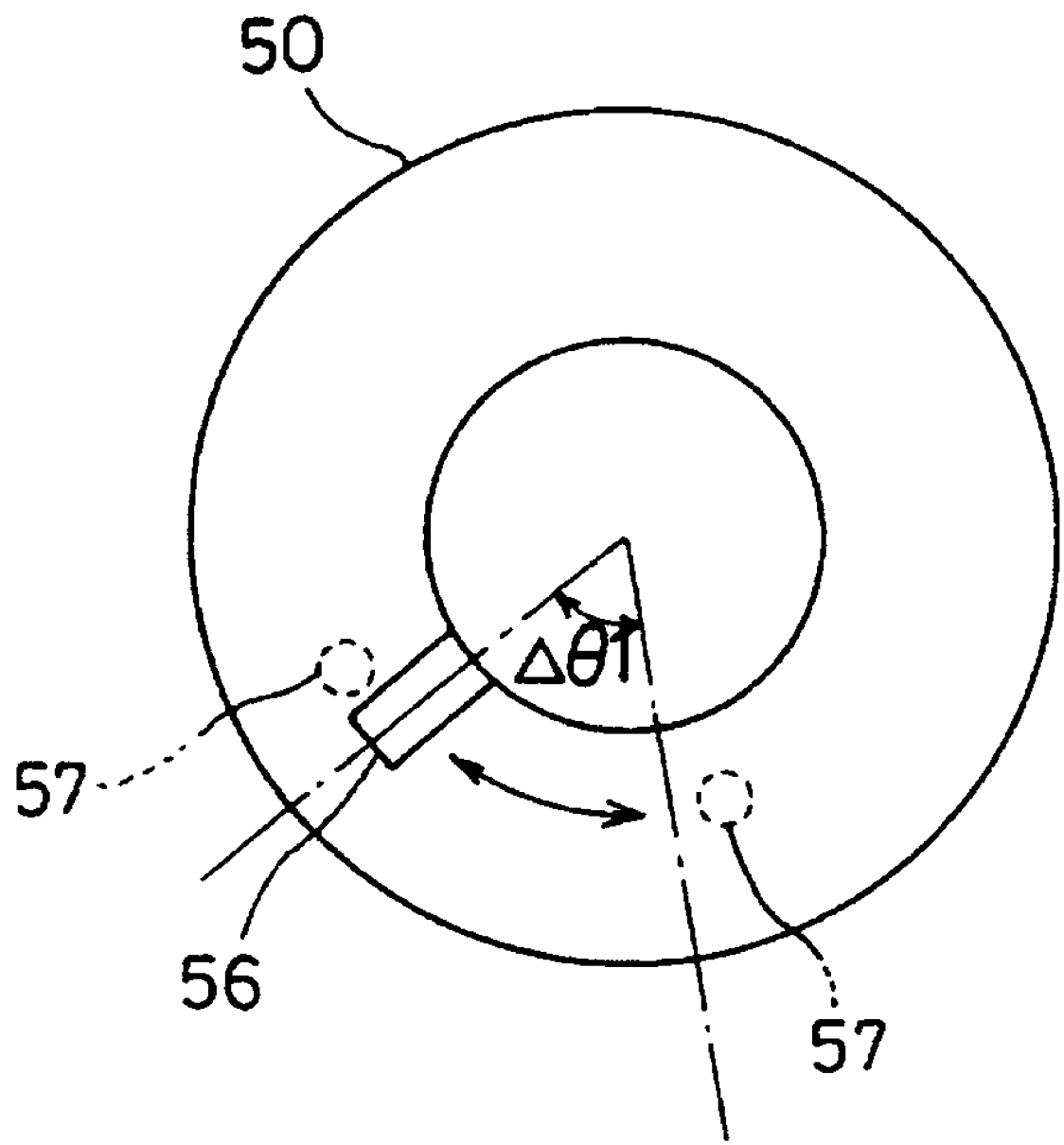
FIG. 3 is a top view showing the movable range for the control shaft in said lift operation angle changing mechanism.

As shown in FIGS. 2 and 3, operation angle sensor 53 is supported by bracket 55, which is fixed to the cylinder head, and detects the rotation angle of control shaft 16, more specifically of pin 53a, which rotates as one unit with control shaft 16, and outputs the detection value (signal) to control unit 54. Also, rotation angle regulating pin 56 is fixed to the rear outer perimeter of control shaft 16. This rotation angle regulating pin 56 moves between a pair of stoppers 57 provided on bracket 55 in order to secure control shaft 16. In other words, rotatable angle range $\Delta\theta1$, in which control shaft 16 can mechanically and physically rotate, is restricted and regulated from the minimum position to the maximum position by rotation angle regulating pin 56 and pair of stoppers 57. Thus, the mechanical variable range of the lift characteristic amount is limited to a range from a minimum value to a maximum value.

Next, an explanation is provided for a specific embodiment of the control routine for lift operation angle changing mechanism 10. These control routines are memorized by said control unit 54, and are repeatedly executed for each specified period (for example, every 10 ms). In the embodiment below, the operation angle is used to conveniently describe the lift characteristic amount, however, the valve lift amount could also be used. Also, the same reference numbers are essentially applied to the identical processes, so redundant explanations are omitted as appropriate.

The first embodiment is described with reference to FIGS. 4 through 6. In S (Step) 11/B (Block)11, the target operation angle equivalent to the target value for the lift characteristic amount is computed/calculated based on accelerator opening APO that corresponds with the number of engine revolutions and the requested engine load (target value calculating means). Said number of engine revolutions is calculated based on, for example, a detection value from commonly known crank angle sensor 31. The APO is detected by accelerator opening sensor 32, for example, which detects the accelerator pedal opening.

At S12/B12, based on the target operation angle and the actual operation angle as a detection value of the lift characteristic amount, any error of the operation angle sensor 53 as a detecting means is detected/determined. The actual operation angle corresponds to the operation angle sensor 53 detection value and is calculated based on this detection value. Even when feedback control cannot be performed for a reason other than an error of the sensor itself, such as because of a communication problem, this S12/B12 determines an error.

At S13/B13, the normal control amount is calculated based on the target operation angle and the actual operation angle.

Figure 6:
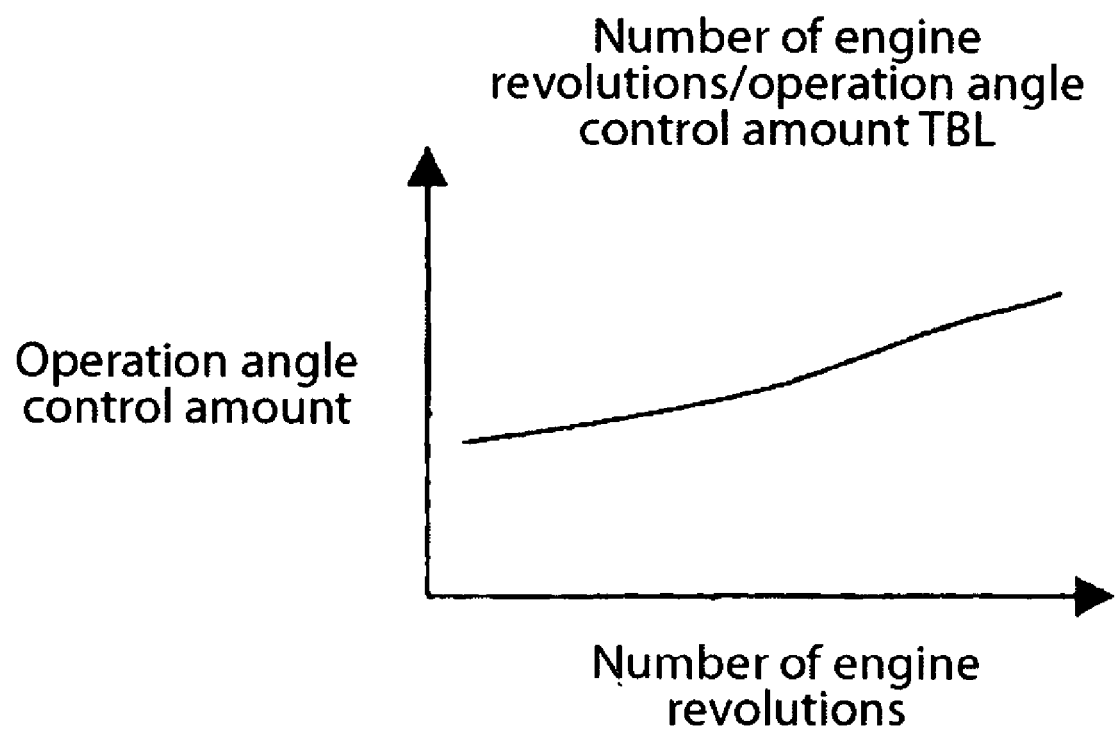
FIG. 6 is an engine revolution count/operation angle control amount table used in said first embodiment.

At S14/B14, as shown in FIG. 6, the failure (error) control amount, which is the second command value for the lift characteristic amount, is calculated with reference to the table showing the number of engine revolutions/operation angle control amount, which is pre-set and pre-stored, based on the number of engine revolutions. As shown in FIG. 6, the higher the number of engine revolutions, the greater the air intake amount becomes, so the failure control amount is also set higher.

At B15, based on a determination normal or abnormal determined at S12/B12, either the normal control amount or the failure control amount is output as the operation angle control amount to motor 51, which is actuator 51 for lift operation angle changing mechanism 10 (command value switching means). In other words, when normal, the normal control amount is output to motor 51, and when abnormal, the failure control amount is output. Motor 51 operates in accordance with this operation angle control amount to change or maintain the rotation position of control shaft 16, thus controlling the valve lift amount and operation angle of intake valve 12, which are the lift characteristic amounts.

According to the present embodiment, under normal operating conditions when operation angle sensor 53 is operating normally, the normal control value is calculated based on the deviation between the target operation angle and the actual operation angle detected by operating angle sensor 53, which is then output to motor 51 to perform said feedback control. In contrast, when a sensor error occurs and feedback control cannot be performed based on the output (actual operation angle) of sensor 53 due to abnormal operation or failure of operation angle sensor 53, open control is performed without using the actual operation angle. However, when the failure control amount output to motor 51 when such a sensor error occurs is calculated based on the number of engine revolutions, as described above, this value changes according to the number of engine revolutions. In other words, it is calculated according to this number of engine revolutions from within a range including intermediate values in the lift characteristic amount variable range.

In this manner, an intermediate value within a variable range can be obtained for the failure control amount when a sensor error occurs, so operation using an intermediate value for the lift characteristic amount is possible. Therefore, engine operability can be improved even when an error occurs, compared to said conventional example in which the lift characteristic amount is maintained at a maximum value or minimum value corresponding to a mechanical connecting pin position, when an error occurs. Particularly, when the variable range for the lift characteristic amount is increased or when the variable range used for feedback control is set at a narrow range in relation to the variable range that is mechanically limited (for example, to a range corresponding to range $\Delta\theta1$ for the control shaft shown in FIG. 3), and if open control is performed of the maximum and minimum value of the mechanically variable range of the lift characteristic amount, this control is very useful for a variable valve mechanism that causes operation failures.

Furthermore, in this first embodiment, because the lift characteristic amount is varied slightly based on only the number of engine revolutions, control is simple and stability is superior. This can be easily applied to existing devices, and because, unlike said conventional example, the lift characteristic value is not switched between the minimum value and the maximum value according to the operation range, a torque jump does not occurs due to this switching.

Figure 7:
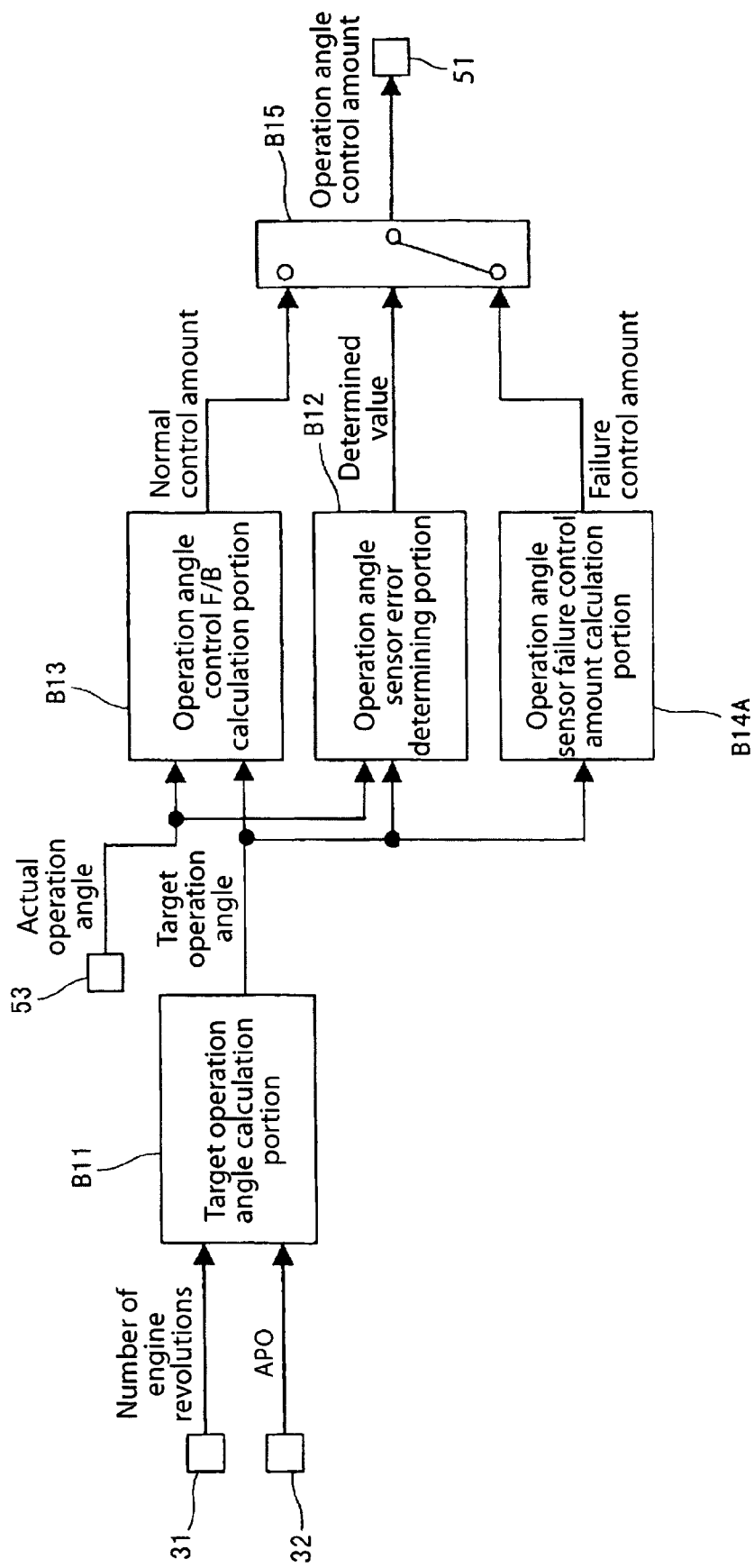
FIG. 7 is a control block diagram pertaining to the second embodiment of the present invention.
Figure 8:
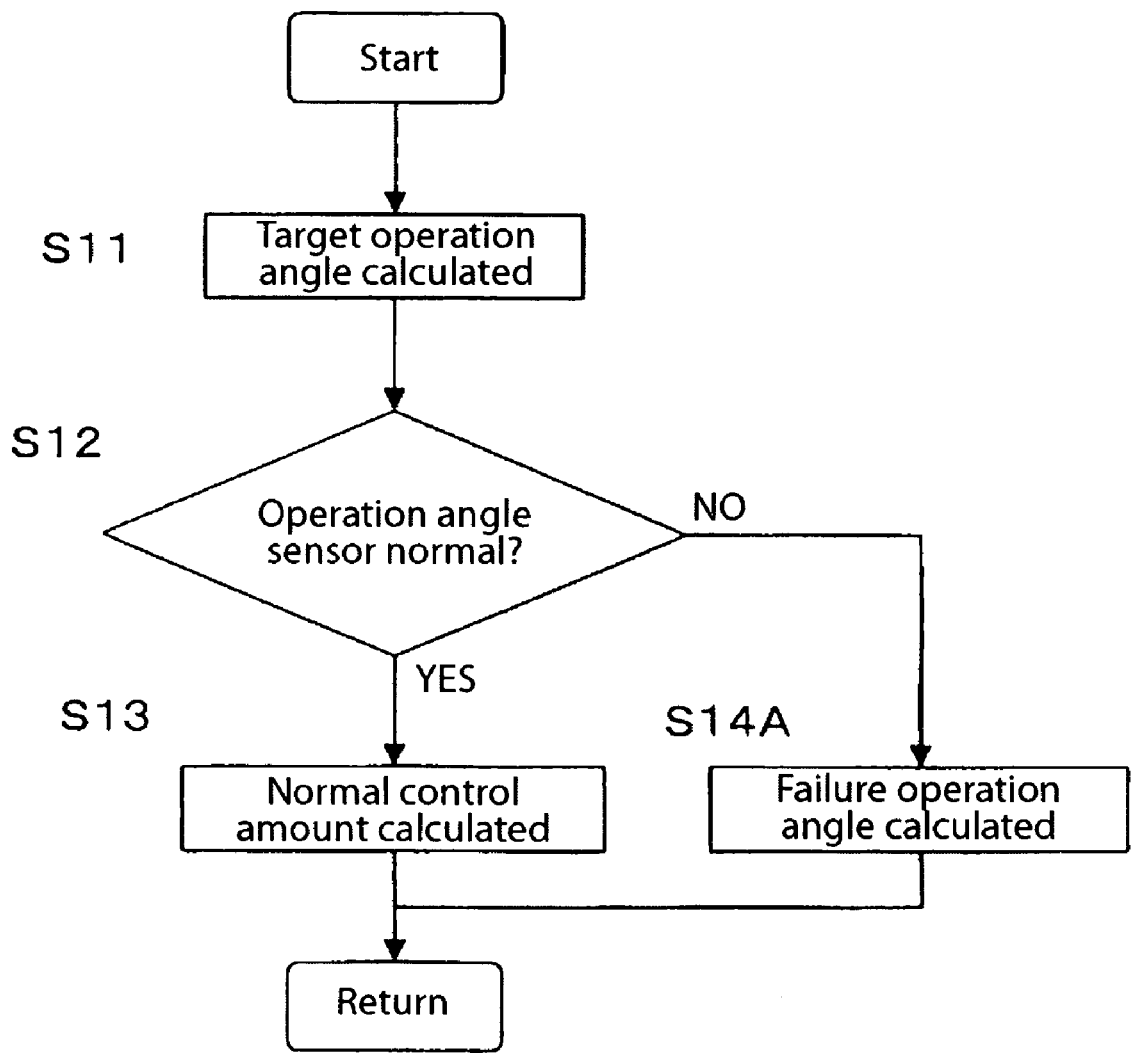
FIG. 8 is a control flowchart pertaining to said second embodiment.
Figure 9:
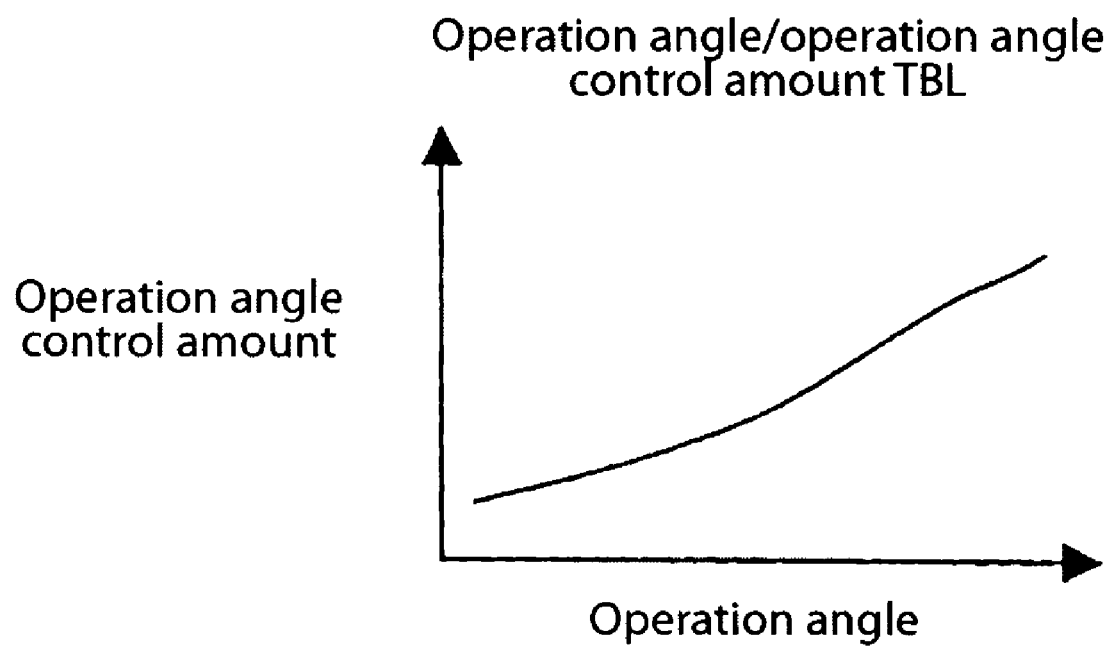
FIG. 9 is an operation angle/operation angle control amount table used in said second embodiment.

For the second embodiment shown in FIGS. 7 through 9, at S14A/B14A, the failure control amount is calculated with reference to the pre-set and pre-stored operation angle/operation angle control amount table shown in FIG. 9 based on the target operation angle. In other words, the failure control amount is calculated based on the target operation angle. As shown in FIG. 9, the failure control amount is basically set such that it increases as the target operation angle increases and decreases as the target operation angle decreases so that the operation angle follows the target operation value when a failure occurs.

Figure 10:
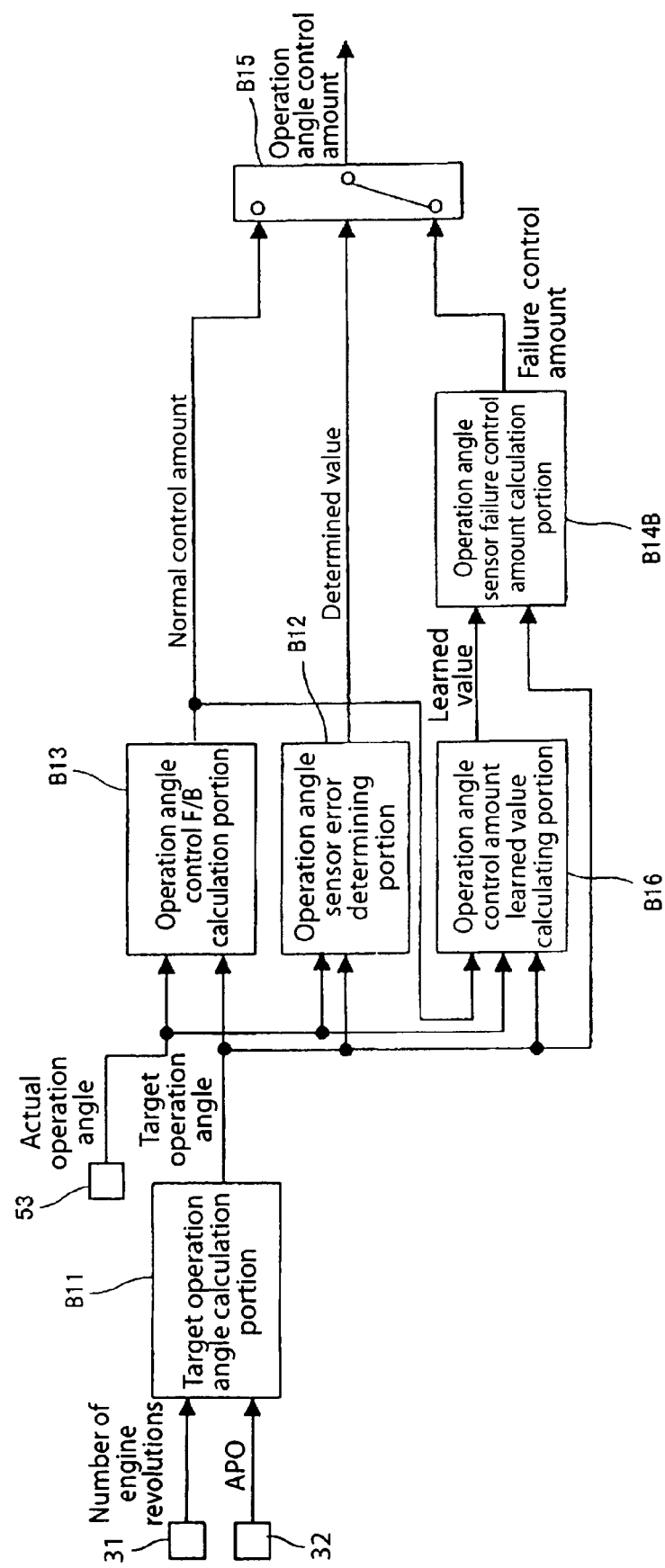
FIG. 10 is a control block diagram pertaining to the third embodiment of the present invention.
Figure 11:
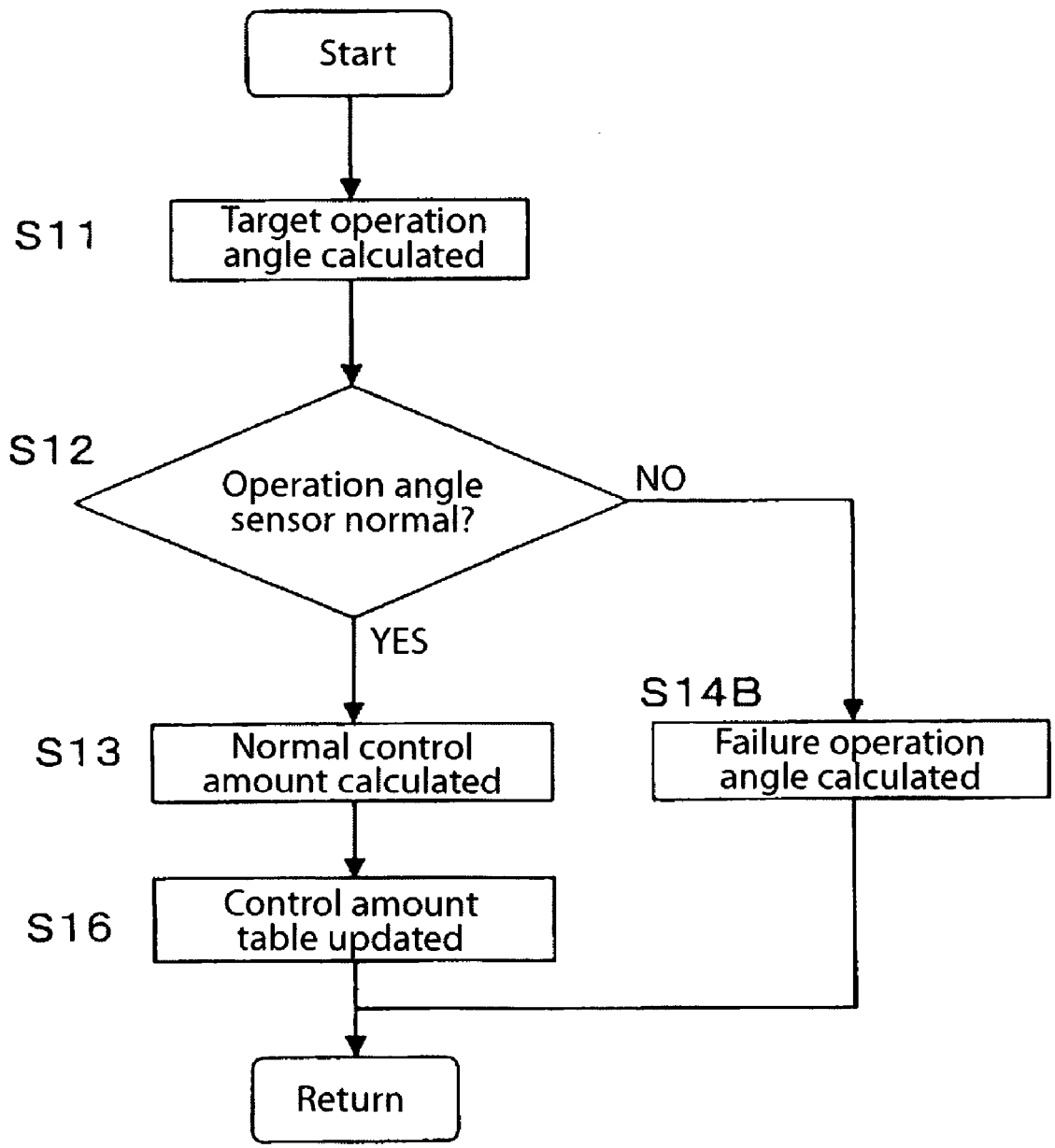
FIG. 11 is a control flowchart pertaining to said third embodiment.
Figure 12:
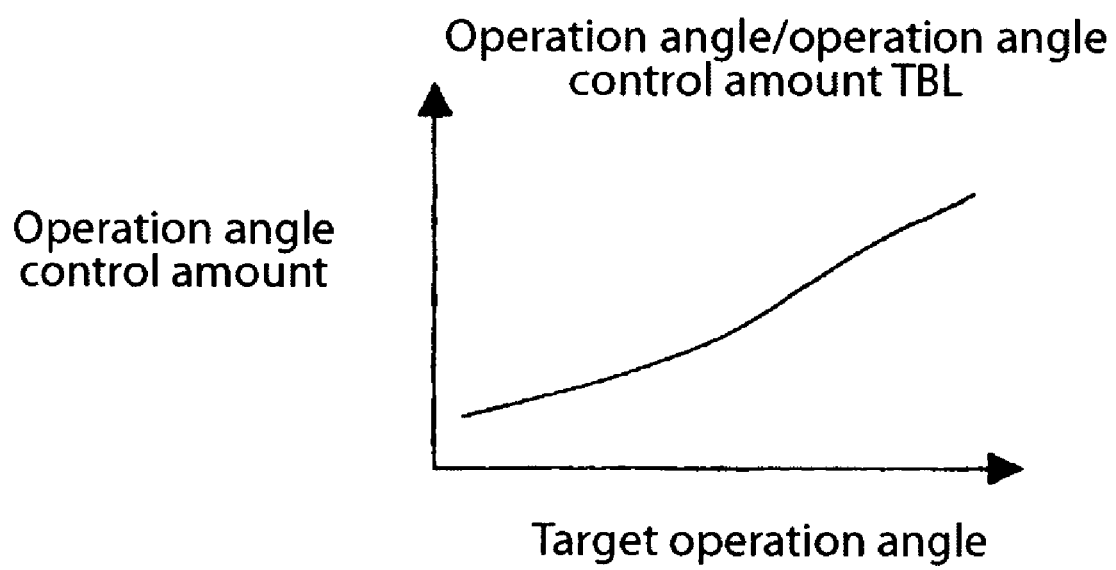
FIG. 12 is an operation angle/operation angle control amount table used in said third embodiment.

In the third embodiment shown in FIGS. 10 through 12, at S16/B16, the learned value for the failure control amount corresponding to the actual operation angle is calculated and stored based on the normal control amount and the actual operation angle calculated at S13/B13. More specifically, the previously set and stored values in the operation angle/operation angle control amount table shown in FIG. 12 is updated one after another. And at S14B/B14B, the failure control amount is calculated based on the actual operation angle and the learned value. More specifically, the failure control amount is obtained by looking up values from the table in FIG. 12, which has been continually updated at S16/B16 based on the actual operation angle.

Thus, according to the third embodiment, when feedback control is performed under normal conditions, learned values are calculated based on the actual operation angle and the normal control amount, and the learned value is used to obtain the failure control amount when a failure occurs so the effects of deterioration over time or fluctuations occurring when the failure control amount is calculated can be absorbed or offset, resulting in improved precision when setting the failure control amount when a sensor error occurs.

For the fourth and fifth embodiments described below, lift operation angle changing mechanism 10 has been applied respectively to left and right banks 1 and 2 of a V-type internal combustion engine. In addition, control shaft 16, operation angle sensor 53, motor 51 etc. have each been provided for lift operation angle changing mechanism 10 on each bank. A "-1" is placed after the reference numbers for the contents of the process corresponding to one of the banks, bank 1, and a "-2" is placed after the reference numbers for the contents of the process corresponding to the other bank, bank 2, and redundant explanations are omitted as appropriate.

Figure 13:
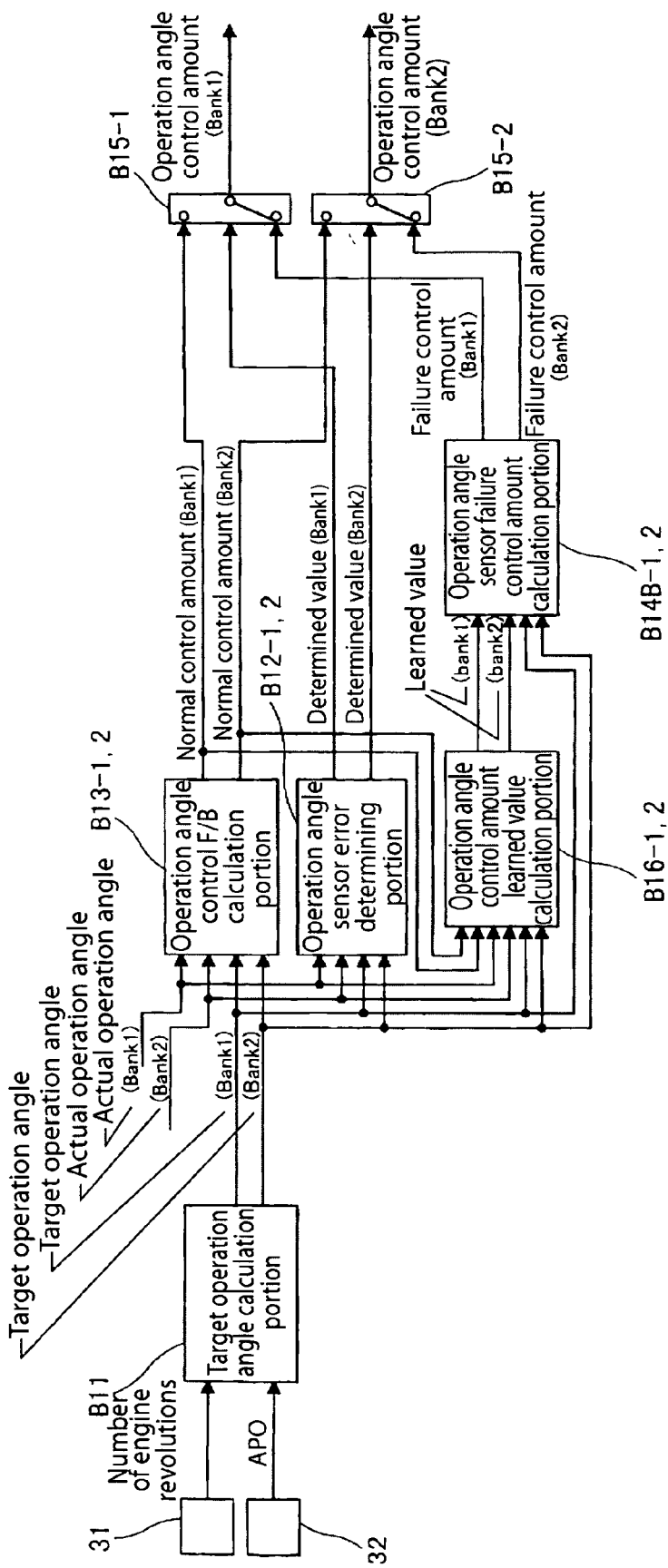
FIG. 13 is a control block diagram pertaining to the fourth embodiment of the present invention.
Figure 14:
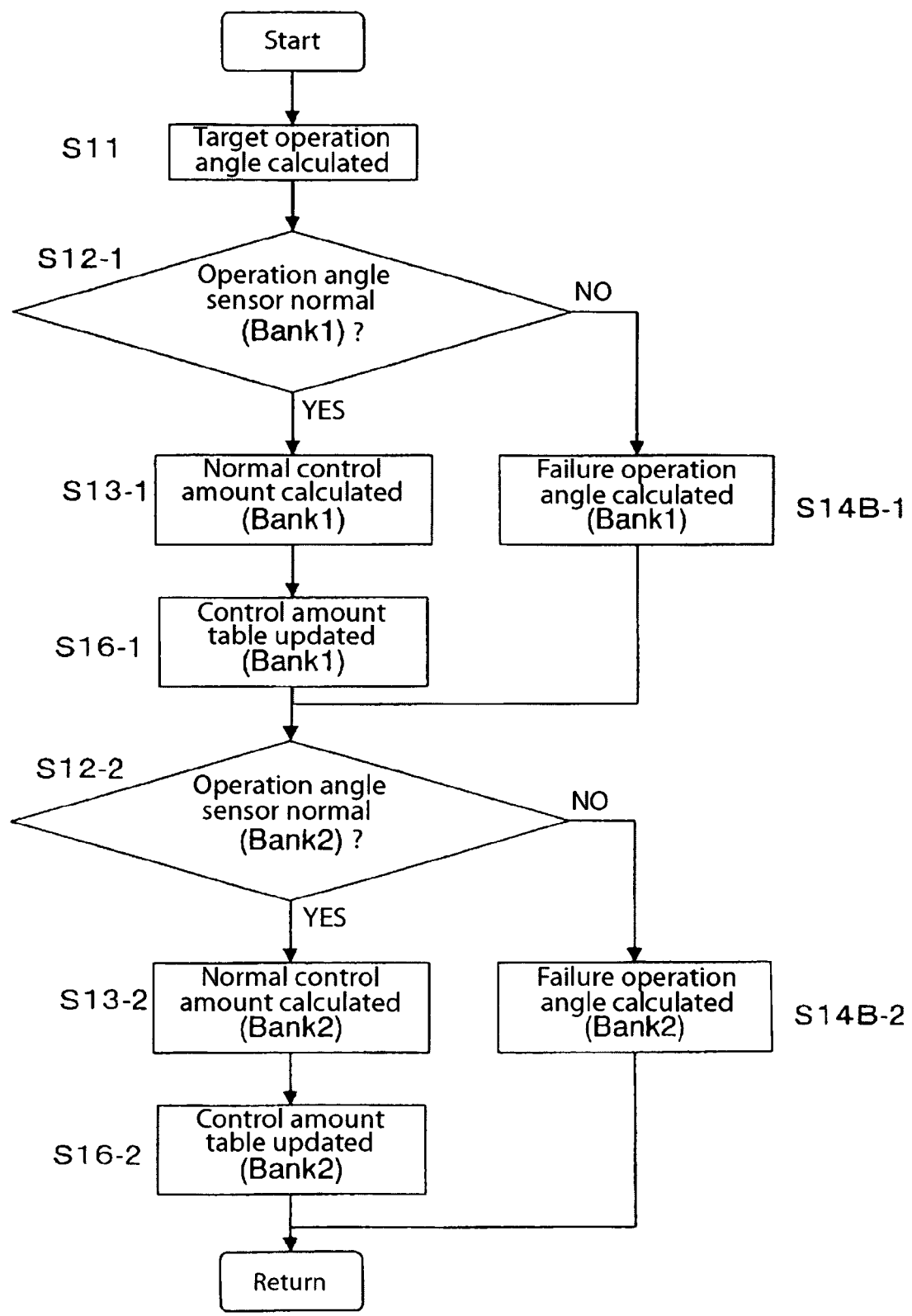
FIG. 14 is a control flowchart pertaining to said fourth embodiment.
Figure 15:
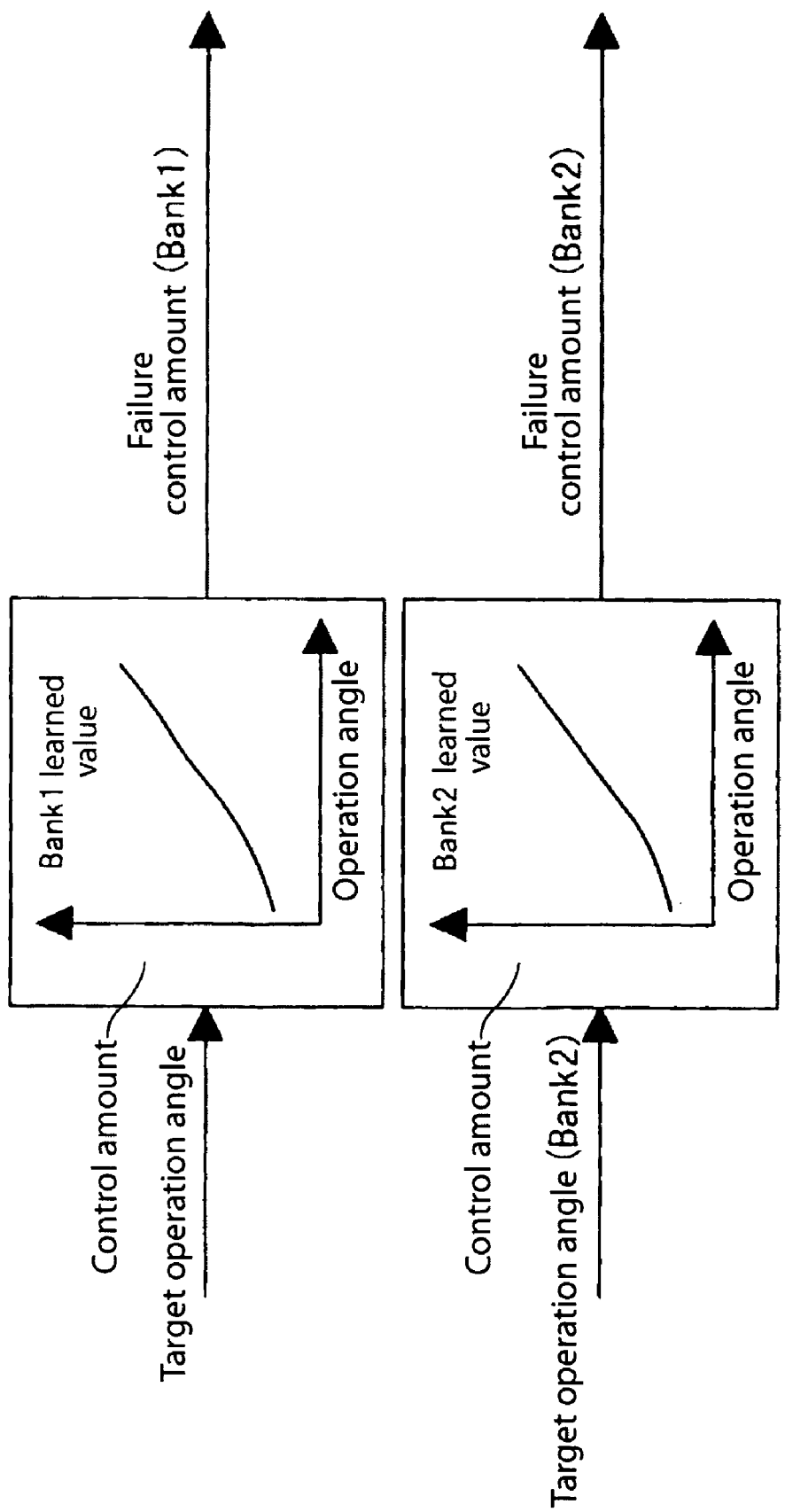
FIG. 15 is an explanatory diagram including operation angle/operation angle control amount tables used by each bank in said fourth embodiment.
Figure 16:
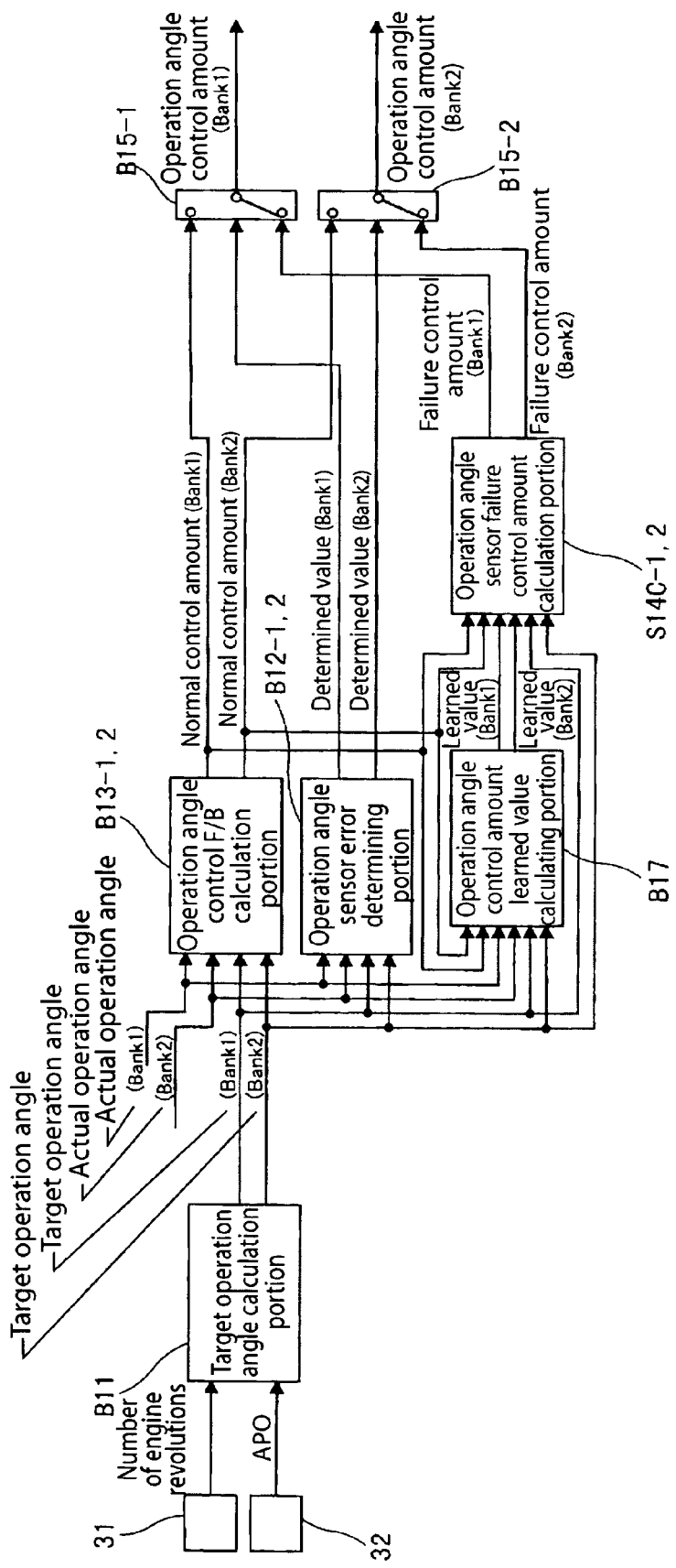
FIG. 16 is a control block diagram pertaining to the fifth embodiment of the present invention.
Figure 17:
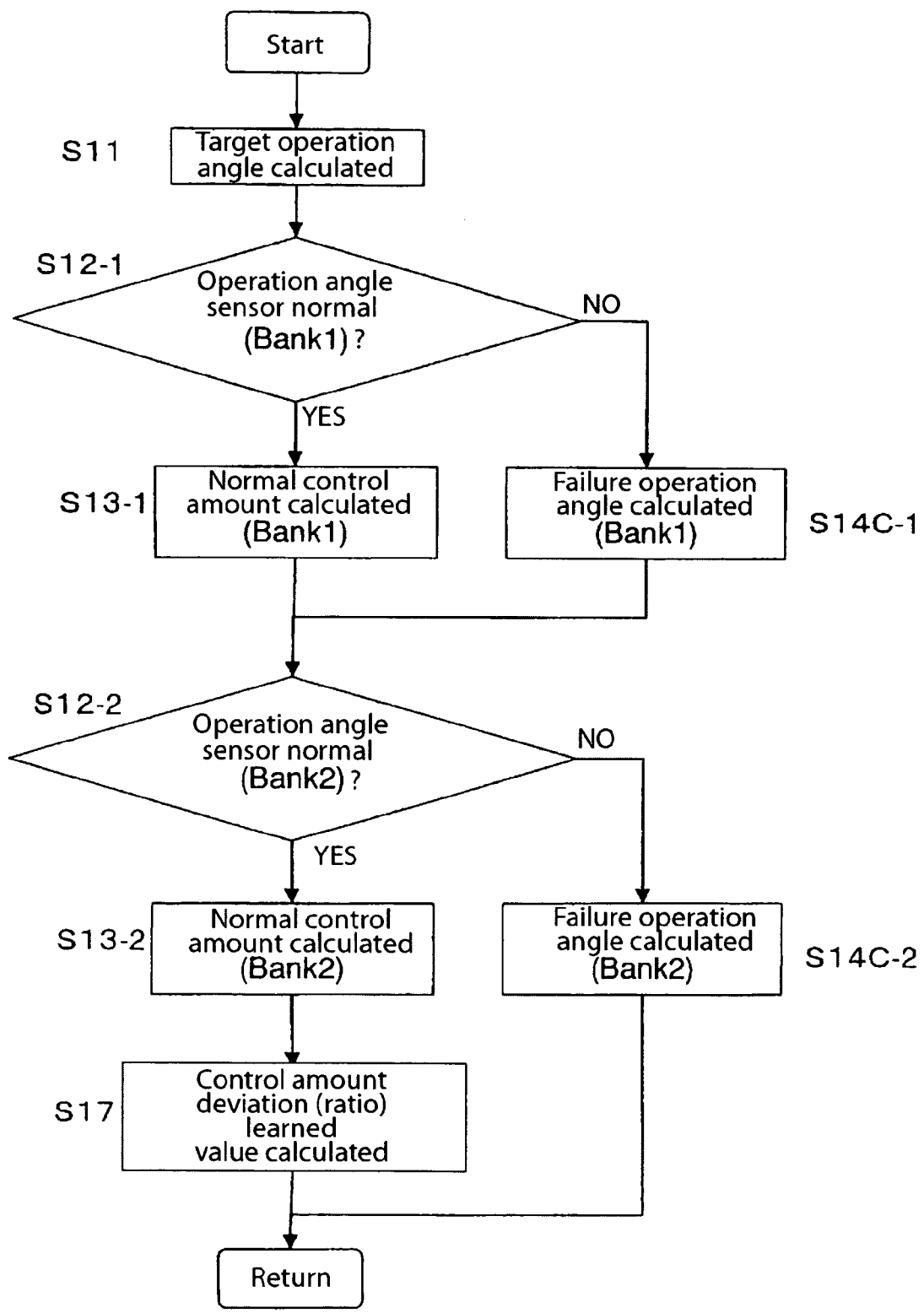
FIG. 17 is a control flowchart pertaining to said fifth embodiment.

In the fourth embodiment shown in FIGS. 13 though 15, the same control process that is used in said Embodiment 3 is applied to the lift operation angle changing mechanisms 10 on bank 1 and bank 2, respectively. Therefore, as shown in FIG. 15, a control amount table is pre-set and pre-stored individually for banks 1 and 2. And under normal conditions, the control amount table is continually updated for each individual bank based on the target operation angle and the normal control amount, and under abnormal conditions, the control amount table is referenced based on the target operation angle for each individual bank to find the failure control amount for that bank.

Figure 18:
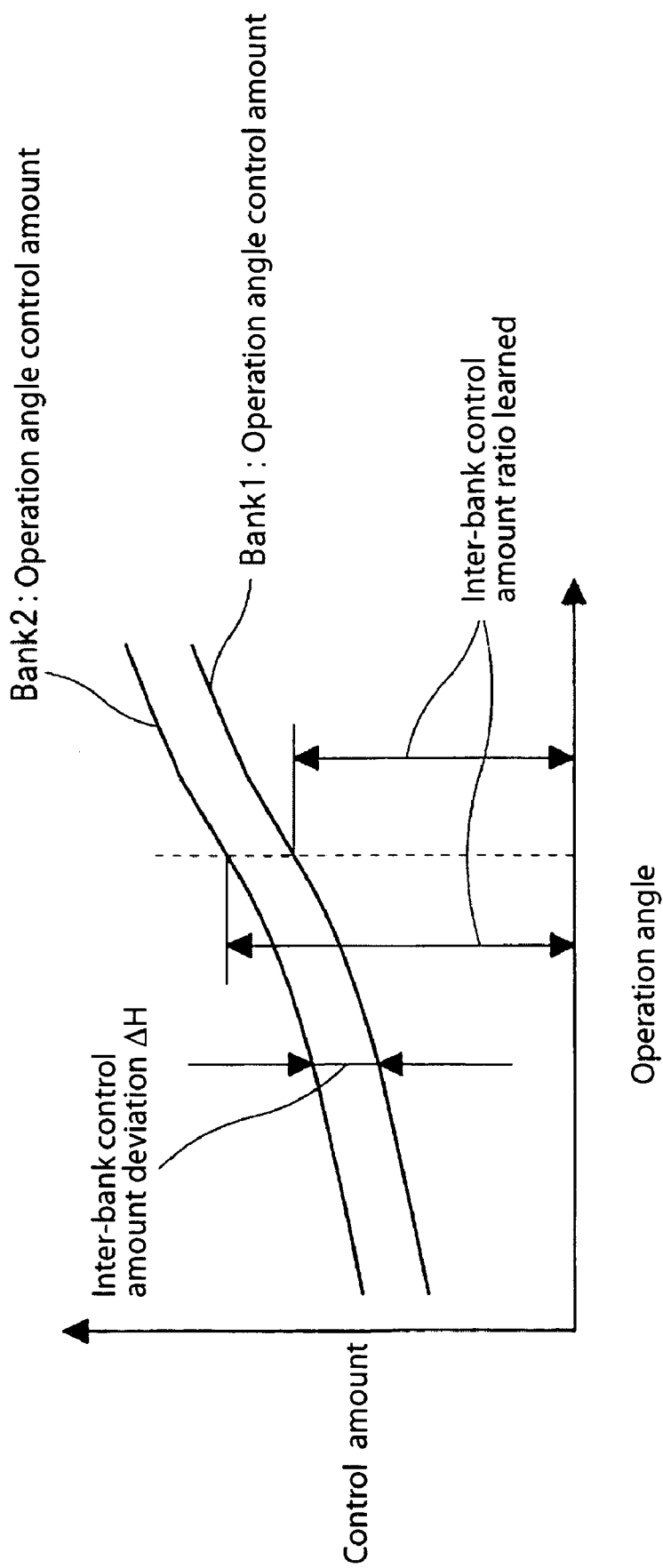
FIG. 18 is an explanatory diagram showing the deviation and ratio of normal control amounts for both banks used in said fifth embodiment.
Figure 19:
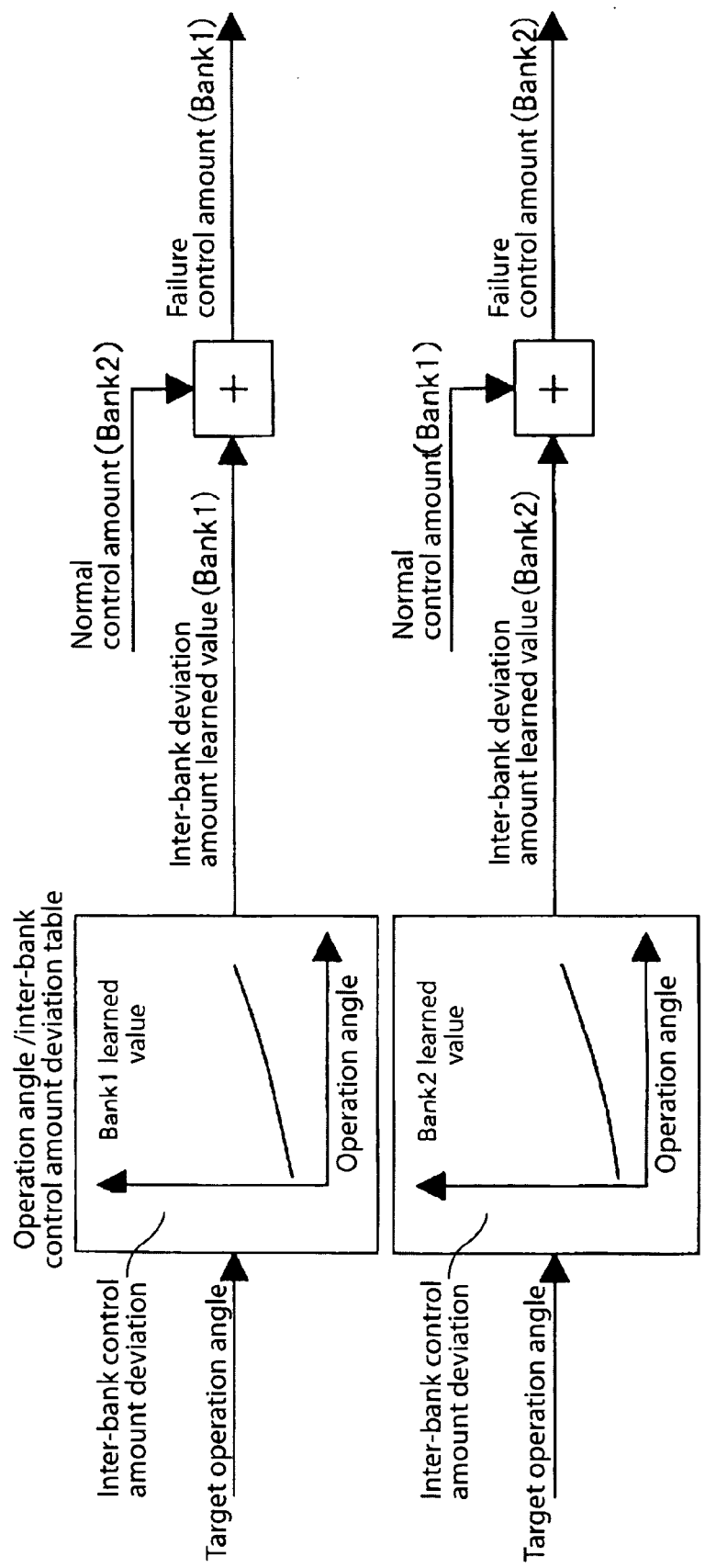
FIG. 19 is an explanatory diagram including an operation angle/inter-bank control amount deviation table used in said fifth embodiment.

A fifth embodiment is shown in FIGS. 16 through 20. When sensors are normal for both banks, at S17/B17, the relationship between the normal control amount deviation and the target operation angle is calculated and stored as a deviation learned value for both banks. More specifically, as shown in FIG. 18, the normal control amount deviation (ΔH) at the current target operation angle is calculated, and based on this deviation ΔH, the values in the operation angle/inter-bank control amount deviation table shown in FIG. 19 are continually updated.

And, when a sensor error occurs in one bank, at S-14C-1,2/B-14C-1,2, the failure control amount for said one bank is calculated based on the target operation angle, the deviation learned value and the normal control amount for the other bank. More specifically, the operation angle/inter-bank control amount deviation table shown in FIG. 19 is referenced based on the target operation angle, and the inter-bank deviation amount learned value corresponding to this target operation angle is found. And by adding or subtracting this inter-bank deviation amount learned value and the normal control amount for the other (normal) bank, the failure control value for said one bank (the one with the error) is calculated.

Figure 20:
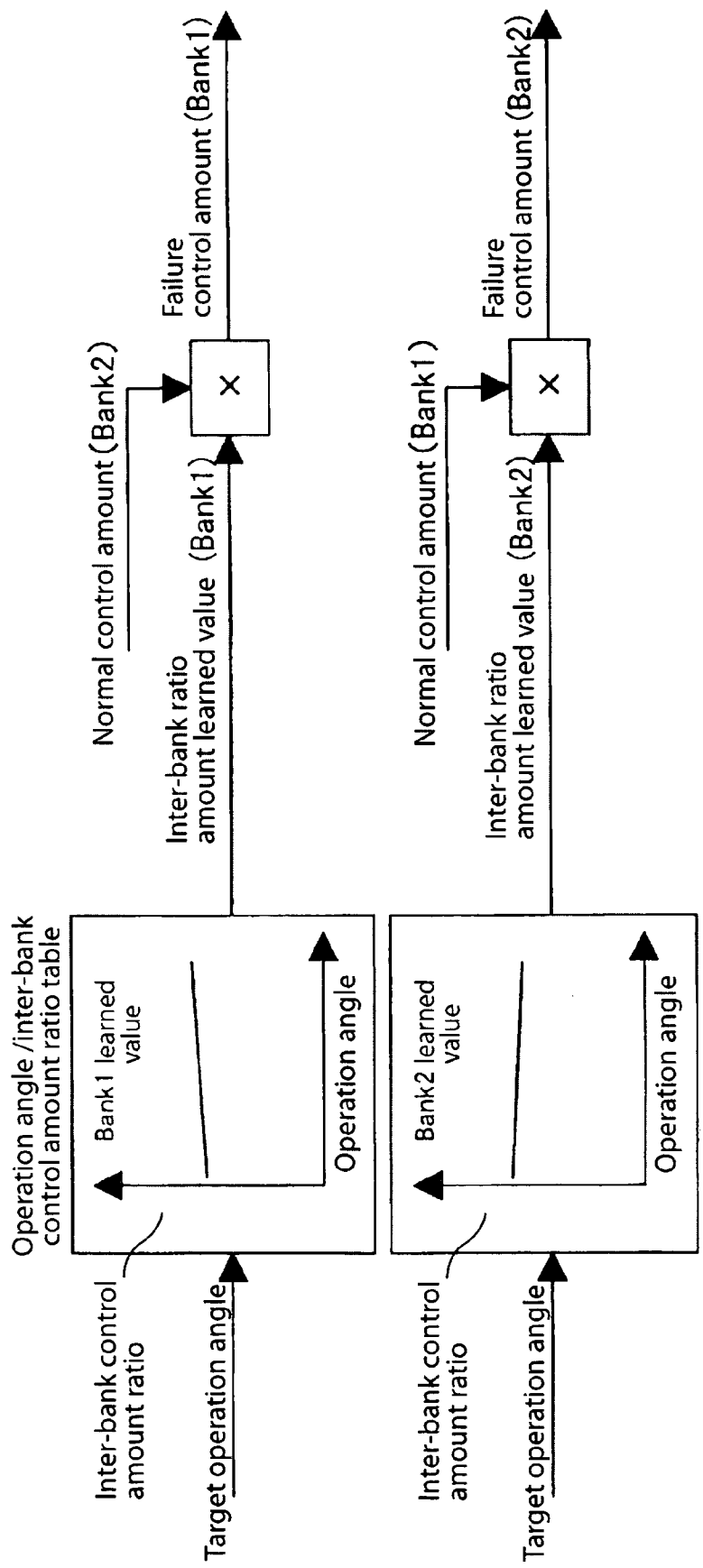
FIG. 20 is an explanatory diagram including an operation angle/inter-bank control amount ratio table used as an alternative example of said fifth embodiment.
Figure 21:
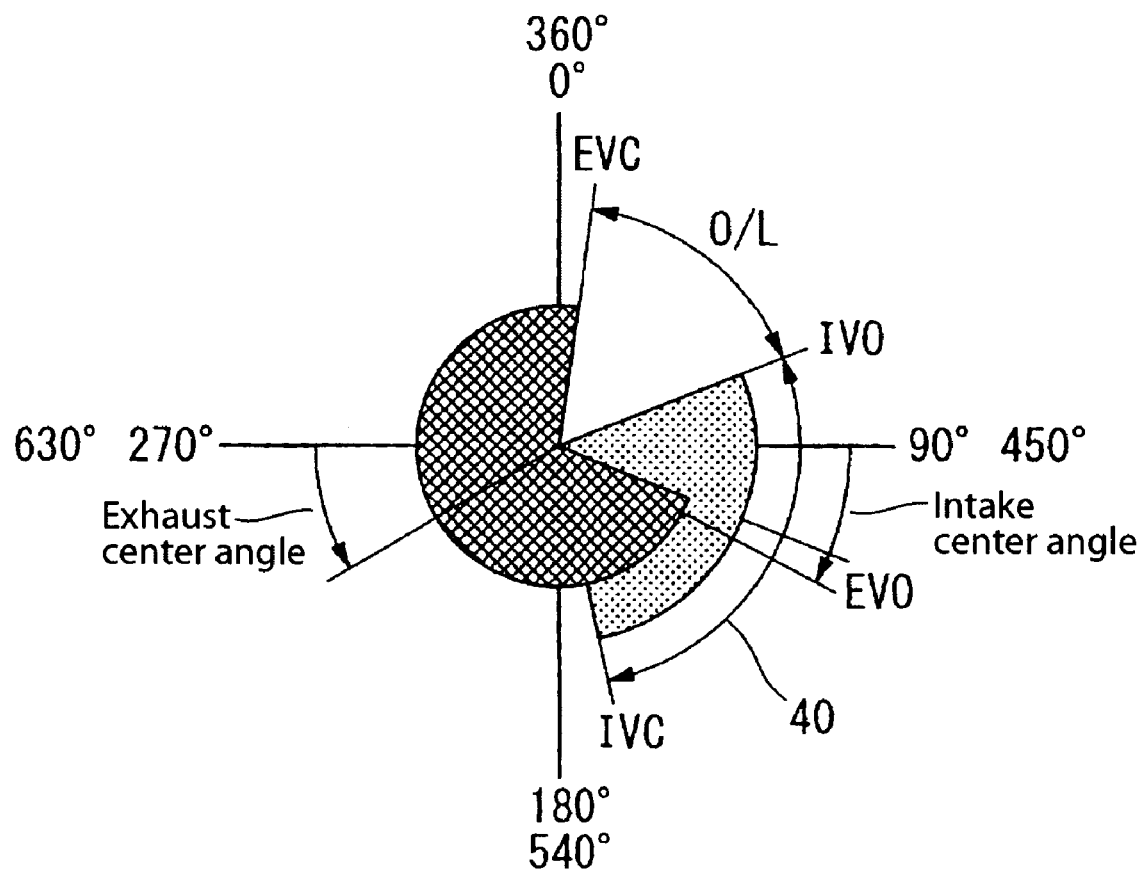
FIG. 21 is an explanatory diagram showing a sample setting for the minimum operation angle using said lift operation angle changing mechanism.
Figure 22:
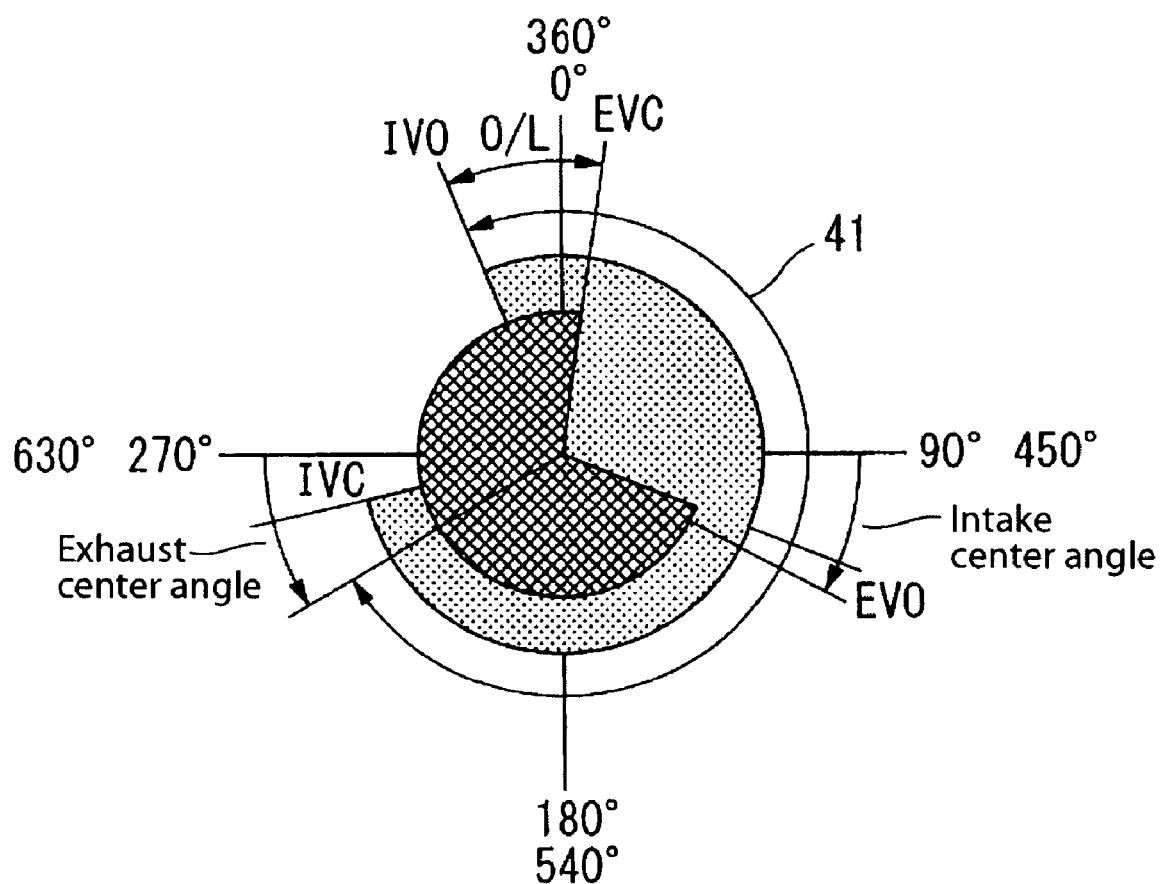
FIG. 22 is an explanatory diagram showing a sample setting for the maximum operation angle using said lift operation angle changing mechanism.

As an alternative example of this fifth embodiment, a ratio can be used in place of said deviation. In other words, when sensors for both banks are normal, at S17/B17, the relationship between the target operation angle and the ratio of normal control amounts for both banks is calculated and stored as a ratio learned value. More specifically, as shown in FIG. 18, the normal control amount ratio for the current target operation angle is calculated, and based on this ratio, the values in the operation angle/inter-bank control amount ratio table shown in FIG. 20 are continually updated. And when a sensor error occurs in one bank, at S14-C-1,2/B14-C-1,2, the failure control amount for said one bank is calculated based on the target operation angle, the ratio learned value, and the normal control amount for the other bank. More specifically, the operation angle/inter-bank control amount ratio table shown in FIG. 20 is referenced based on the target operation angle, the inter-bank control amount ratio learned value corresponding to this target operation angle is calculated, and the failure control value for said one bank (the one with the error) is calculated based on this inter-bank control amount ratio learned value and the normal control amount for the other (the normal one) bank.

Next, an explanation is provided of the unique technological concept and operational effect of the present invention with respect to the aforementioned embodiments. However, the present invention is not limited to the content of said embodiments, but includes a variety of modifications and alterations. For example, in the aforementioned embodiments, the variable valve mechanism is applied to an intake valve, but the present invention can be similarly applied to a variable valve mechanism applied to an exhaust valve. Also, in said embodiments, the present invention is applied to lift operation angle changing mechanism 10, but it can also be applied to other variable valve mechanisms such as aforementioned phase changing mechanism 70. In addition, the actuator for the variable valve mechanism is not limited to an electrically-powered type that uses aforementioned motor 51, or the like, but could also be a hydraulically driven type.

(1) The present invention provides a variable valve mechanism (lift operation angle changing mechanism 10/phase changing mechanism 70) that can continuously change lift characteristic amounts within a specified variable range for an intake valve (12) or an exhaust valve on an internal combustion engine; an actuator (motor 51) for driving this variable valve mechanism; and a detecting means (operation angle sensor 53) for obtaining the detection value of said lift characteristic amounts (valve lift amount/operation angle/valve timing). The present invention has a target value calculation means (S11/B11) for calculating the target value (target operation angle) of said lift characteristic amounts based on engine operating conditions; a first command value calculation means (S13/B13, etc.) for calculating the first command value (normal control amount) of said lift characteristic amounts based on said target value and detection value (actual operation angle); a second command value setting means (S14/B14, etc.) for setting the second command value (failure control amount) of said lift characteristic amounts; an error determination means (S12/B12, etc.) for determining errors in said detecting means, and a command value switching means (B15, etc.) for outputting the first command value to the actuator when said detecting means is normal, and for outputting the second command value to the actuator when an error occurs.

Said second command value setting means sets the second command value from within a range including intermediate values within said variable range. For example, in said first embodiment, as shown in FIG. 6, the failure control amount, which is the second command value, is changed according to the number of engine revolutions, indicating that an intermediate value within the variable range can be obtained as the second command value. Likewise, in other embodiments, the second command value is variably controlled, and an intermediate value can be obtained as this second command value.

Therefore, operation using intermediate values for lift characteristic amounts becomes possible even when an error occurs in the detecting means by setting an intermediate value within the variable range as a second command value. Therefore, engine operability during an error can be improved, compared to said conventional example in which lift characteristic amounts are maintained during an error at a maximum value or minimum value corresponding to a mechanical connector position. In other words, even during an error, stabilized operability can be ensured within a wide range of engine operation (rotation/load range).

Figure 23:
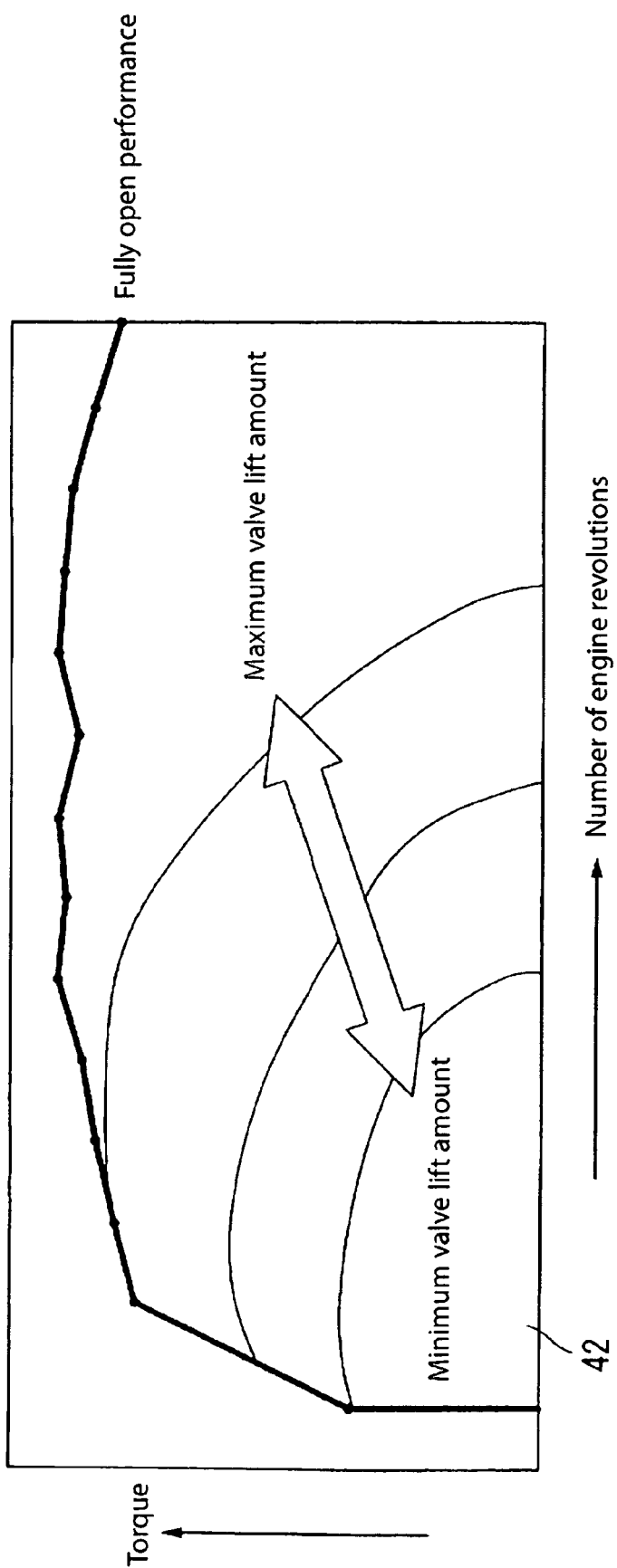
FIG. 23 is an explanatory diagram showing a sample setting for the valve lift amount using said lift operation angle changing mechanism.
Figure 24:
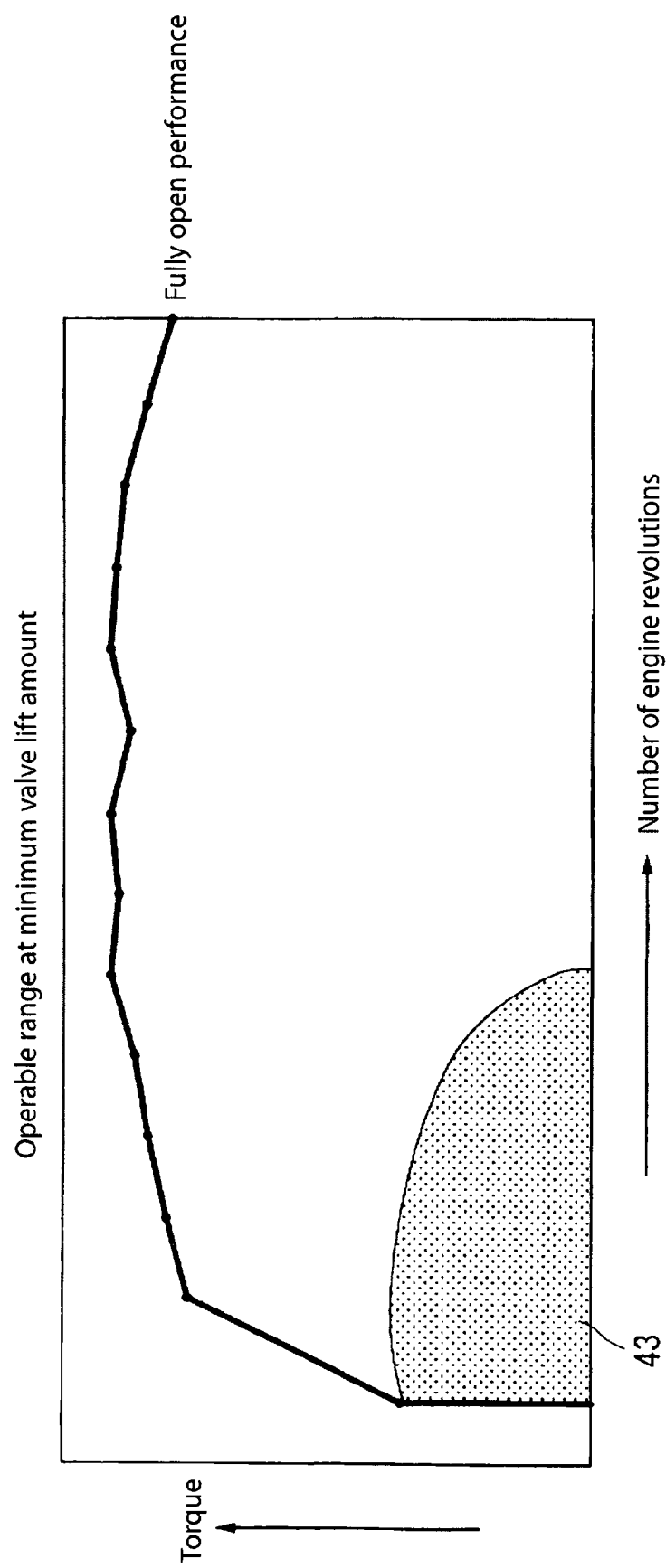
FIG. 24 is an explanatory diagram showing the operable range at the minimum valve lift amount using said lift operation angle changing mechanism.

For example, as shown in FIG. 23, when ensuring a wide variable range for the valve lift amount, which is the lift characteristic amount, at setting condition 42 in which the valve lift amount is extremely low, the desired torque cannot be achieved in a high revolution range. For a reference, FIG. 24 shows operable range 43 in which the valve lift amount is at the minimum amount. In addition, even when the variable range used for feedback control is set at a narrow range in relation to a mechanical variable range from the maximum value, which is the mechanical connector position, to the minimum value, if the lift characteristic amount is open-controlled to the maximum or minimum values, there is a risk of hindering operability, so the control provided for in the present invention is very useful with respect to these variable valve mechanisms.

Figure 4:
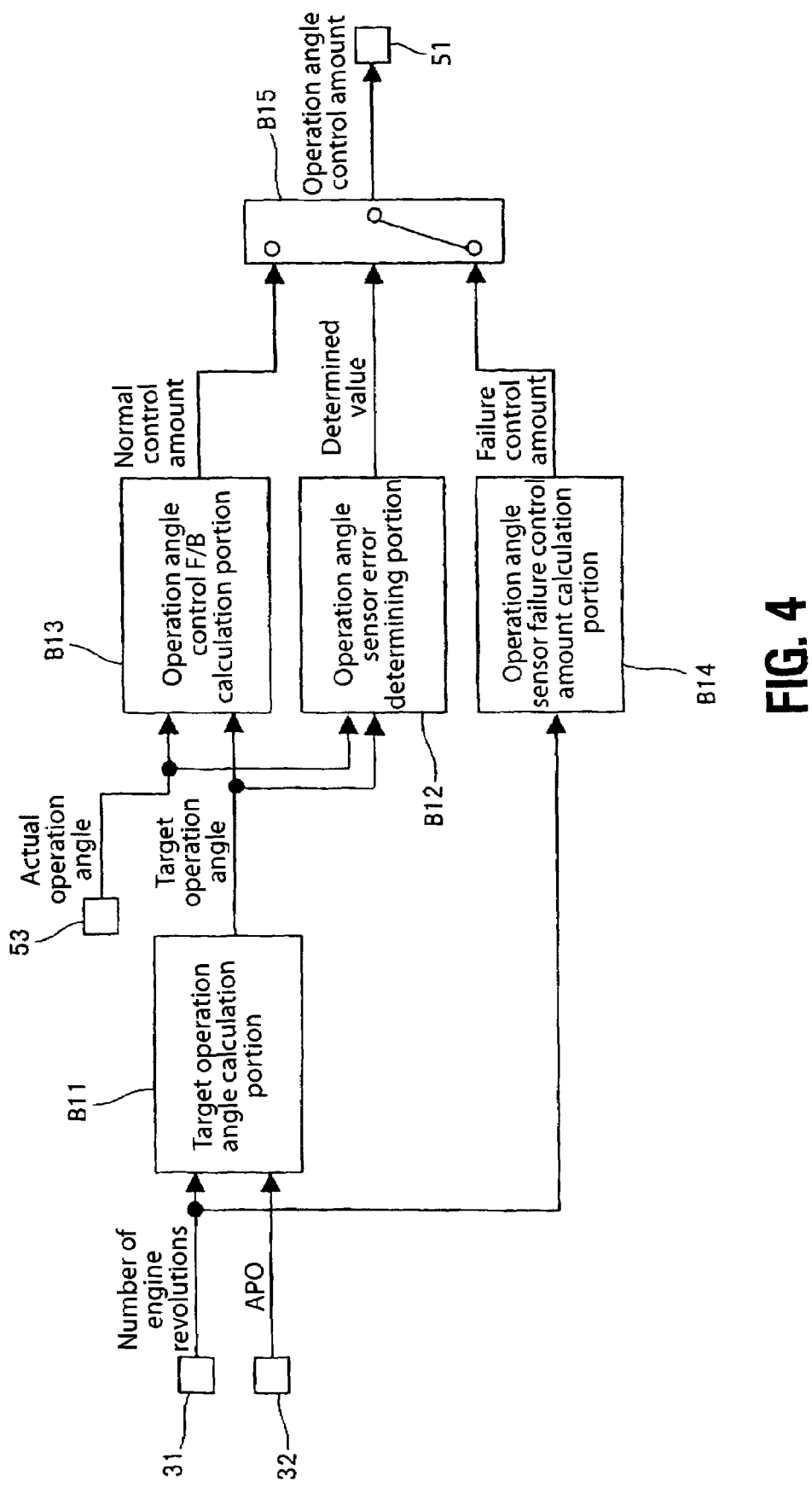
FIG. 4 is a control block diagram pertaining to the first embodiment of the present invention.
Figure 5:
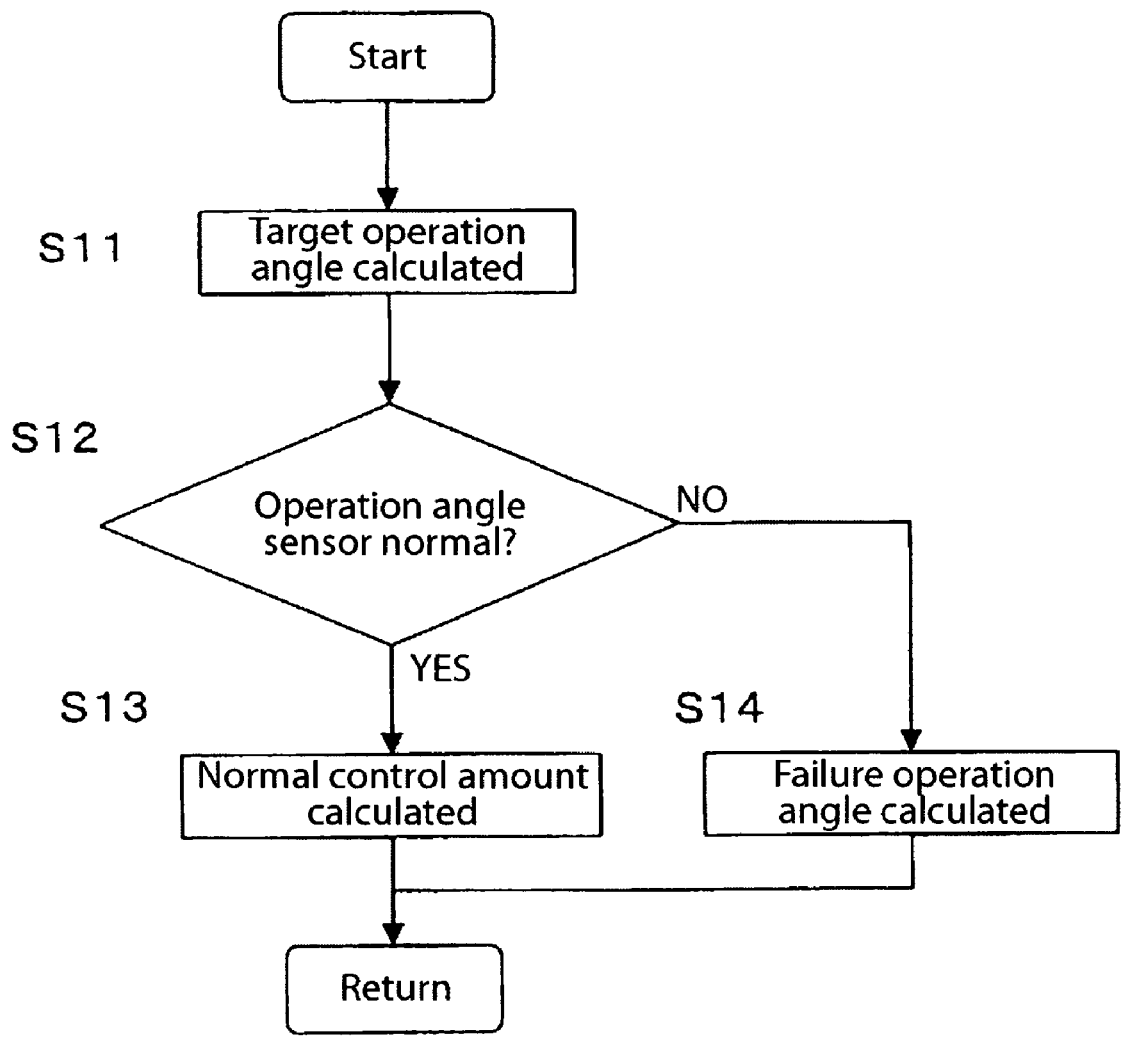
FIG. 5 is a control flowchart relating to said first embodiment.

(2) Preferably, as in the first embodiment shown in FIGS. 4 through 6, the second command value setting means (S14/B14) calculates the second command value based on the number of engine revolutions so that the second command value (failure control amount) is higher when the number of engine revolutions is higher. Thus, by providing a simple calculation process based on the number of engine revolutions, insufficient torque that takes place during high engine revolution when an error occurs can be effectively eliminated. (See FIG. 23).

(3) Or for the second embodiment shown in FIGS. 7 through 9, said second command value setting means (S14A/S14B) calculates the second command value based on said target value so that the second command value (failure control amount) is higher when said target value (target operation angle) is higher. Thus, by calculating the lift characteristic amounts based on target values even when an error occurs, favorable operation becomes possible in a wide range of operation. In addition, since the target value used during normal operation is being utilized, the burden placed on control is small and application to existing control devices becomes easier.

(4) Or for the third embodiment shown in FIGS. 10 through 12, a learning means (S16/B16) may be provided that calculates and stores the relationship between said target value and the first command value during normal operation as a learned value. Said second command value setting means (S14B/S14A) calculates the second command value based on said target value and the learned value. Thus by learning the relationship between the target value and the first command value during normal operation, and by using this learned value and the target value to calculate the second command value when an error occurs, the effects of deterioration over time and fluctuations can be absorbed or offset, resulting in improved precision when setting the second command value and increased operability when an error occurs.

As in the case of the fourth embodiment shown in FIGS. 13 though 15, this type of control can easily be applied to respective variable valve mechanisms provided for each bank 1 and 2 in a V-type internal combustion engine.

(5) As in the case of the fifth embodiment shown in FIGS. 16 through 20, when at least two variable valve mechanisms (10) are provided and controlled to achieve the same target value (target operation angle), a deviation learning means (S17/B17) is provided that calculates and stores the relationship between said target value and the deviation ΔH between the detection values for the two variable valve mechanisms as the deviation learned value during said normal operation. And said second command value setting means (S14C-1,2/B14C-1,2) is configured so that the second command value for one variable valve mechanism is calculated based on said deviation learned value, the target value, and the first command value for the other variable valve mechanism.

Because the second command value (failure control amount) for the bank that has the error is calculated based on the first command value for the other variable valve mechanism, or more specifically, on the feedback control amount for the normal bank, the second command value can be calculated with good precision in accordance with the operating conditions. Also, since the second command value is calculated based on the deviation between the first command values for the two variable valve mechanisms during normal operation, the deviation in lift characteristic amounts between both variable valve mechanisms as well as deterioration over time and changes in the environment can be favorably absorbed or offset to further improve operability when an error occurs.

(6) And as is the case with the alternative example for the fifth embodiment shown in FIGS. 16 through 20, a ratio learning means (S17/B17) is provided that calculates and stores the relationship between said target value and the ratio of the detection values for the two variable valve mechanisms as the ratio learned value during said normal operation. And said second command value setting means (S14C-1,2/B 14C-1,2) is configured so that the second command value for one variable valve mechanism is calculated based on said ratio learned value, the target value, and the first command value for the other variable valve mechanism. Thus, by using a ratio, the operability can be significantly improved when an error occurs, as was the case when using said deviation.

(7) The variable valve mechanism applied to the present invention is preferably as shown in FIG. 1, lift operation angle changing mechanism 10 for which the intake/exhaust valve lift amount and operation angle are continuously changeable. When using such a lift operation angle changing mechanism 10, the air intake amount can be widely controlled without relying on a throttle valve, which allows for significant improvement of mileage and output performance, but at the same time, since the air intake amount greatly fluctuates based on changes in the lift characteristic amounts, using open control to control the minimum side or the maximum side of the variable range when an error occurs, while trying to ensure a wide variable rang may hinder the engine operability. Therefore, as explained above, the control provided by the present invention is extremely effective when an error occurs.

CONCLUSION

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A variable valve mechanism control device, comprising a variable valve mechanism for an internal combustion engine intake valve or exhaust valve, wherein a characteristic lift amount of the variable valve mechanism is continuously variable within a specified range;
a first actuator to drive the variable valve mechanism;
a first sensor to detect the current characteristic lift amount being set by the first actuator in the variable valve mechanism; and
a variable valve mechanism control device adapted to control the first actuator to vary the characteristic lift amount within the specified range during a normal operation mode and to vary the characteristic lift amount within a sub-range of the specified range during an error operation mode when an error occurs in the first sensor; and
wherein the variable valve mechanism control device is adapted to store a learned value based on a target value for current engine operating conditions and a command value for the normal mode of operation, and wherein the variable valve mechanism control device is adapted to control the first actuator to vary the characteristic lift amount within the sub-range during the error operation mode based on at least the target value and the learned value.

2. The variable valve mechanism control device of claim 1, wherein the sub-range is a sub-range of intermediate values of the specified range.

3. The variable valve mechanism control device of claim 1, wherein the variable valve mechanism control device is adapted to control the first actuator to vary the characteristic lift amount within the specified range during the normal operation mode based on the target value and the current characteristic lift amount detected by the first sensor.

4. The variable valve mechanism control device of claim 1, wherein the variable valve mechanism control device is adapted to control the first actuator to vary the characteristic lift amount within the sub-range of the specified range during the error operation mode based on an engine revolution count.

5. The variable valve mechanism control device of claim 1, wherein the learned value is a learned relationship value between the target value and a corresponding command value output to the first actuator during the normal mode of operation.

6. The variable valve mechanism control device of claim 1, wherein the variable valve mechanism is a lift operation angle changing mechanism comprising:
a drive shaft rotatably linked to a crankshaft;
an eccentric cam eccentrically provided on this drive shaft;
a control shaft rotated by the actuator;
a control cam eccentrically provided on this control shaft;
a rocker arm eccentrically provided on this control cam;
a rocking cam for lifting an intake valve or an exhaust valve;
a first link for linking a first end of the rocker arm to the eccentric cam; and
a second link for linking a second end of the rocker arm to the rocking cam.

7. A variable valve mechanism control device, comprising:
a variable valve mechanism for an internal combustion engine intake valve or exhaust valve, wherein a characteristic lift amount of the variable valve mechanism is continuously variable within a specified range;
an actuator to drive the variable valve mechanism;
detecting means for obtaining a detection value indicative of the current characteristic lift amount being set by the variable valve mechanism;
target value calculation means for calculating a current target value for the characteristic lift amount based on current engine operating conditions;
first command value setting means for setting a first command value output for the characteristic lift amount, based on the current target value and the detection value;
second command value setting means for setting a second command value output for the characteristic lift amount;
error determination means for determining when an error occurs in the detecting means;
learning means for calculating and storing a learned relationship value between a target value and a corresponding first command value output during normal operation; and
command value switching means for coupling the first command value output to the actuator during normal operation of the detecting means and for coupling the second command value output to the actuator when an error occurs in the detecting means, wherein the second command value output from the second command value setting means is selected from within a sub-range of intermediate values in the specified range and is based on at least the target value and the learned relationship value when the error occurs.

8. The variable valve mechanism control device of claim 7, wherein the second command value setting means calculates the second command value output based on an engine revolution count, such that the second command value output is higher when the engine revolution count is higher.

9. The variable valve mechanism control device of claim 7, wherein the second command value setting means calculates the second command value output higher when the target value is higher.

10. The variable valve mechanism control device of claim 7, wherein the variable valve mechanism is a lift operation angle changing mechanism comprising:
- a drive shaft rotatably linked to a crankshaft;
- an eccentric cam eccentrically provided on this drive shaft;
- a control shaft rotated by the actuator;
- a control cam eccentrically provided on the control shaft;
- a rocker arm eccentrically provided on the control cam;
- a rocking cam for lifting an intake valve or an exhaust valve;
- a first link for linking a first end of the rocker arm to the eccentric cam; and
- a second link for linking a second end of the rocker arm to the rocking cam.

11. A variable valve mechanism control method for a variable valve mechanism for an internal combustion engine intake valve or exhaust valve having an actuator to drive the variable valve mechanism such that it has a valve lift characteristic value that is continuously changeable within a specified variable range, and a sensor for obtaining a detection value for the current valve lift characteristic, the method comprising:
- calculating a target value within the specified variable range of valve lift characteristic values based on engine operating conditions;
- outputting a first command value to the actuator based on the target value and the detection value during normal operation of the variable valve mechanism;
- learning a learned relationship value between the target value and the first command value output during the normal operation of the variable valve mechanism; and
- outputting a second command value to the actuator for the valve lift characteristic value when an error is identified in the sensor of the variable valve mechanism, wherein the second command value is selected from within a sub-range of valve lift characteristic values, the second command value based on at least the target value and the learned relationship value.

12. The method of claim 11, wherein the sub-range of valve lift characteristic values is a sub-range of intermediate valve lift characteristic values of the specified variable range.

13. The method of claim 11, wherein the second command value is selected from within the sub-range of valve lift characteristic values based on an engine revolution count.

14. An internal combustion engine, comprising:
- a variable valve mechanism for an intake valve or exhaust valve, wherein a characteristic lift amount of the variable valve mechanism is continuously variable within a specified range;
- an actuator to drive the variable valve mechanism through the specified range and set a current characteristic lift amount;
- a sensor to detect the current characteristic lift amount being set by the actuator in the variable valve mechanism;
- a variable valve mechanism control coupled to the actuator and the sensor; and
- a variable valve mechanism control device adapted to store a learned value based on a target value for current engine operating conditions and a command value for the normal mode of operation and adapted to control the actuator to vary the characteristic lift amount within the specified range during normal operation and to vary the characteristic lift amount within a sub-range of the specified range when an error occurs in the sensor, the characteristic lift amount during an error operation mode resulting from the error based on at least the target value and the learned value.

15. The internal combustion engine of claim 14, wherein the sub-range is a sub-range of intermediate values of the specified range.

16. The internal combustion engine of claim 14, wherein the variable valve mechanism control device is adapted to control the actuator to vary the characteristic lift amount within the specified range during a normal operation mode based on the target value for current engine operating conditions and the current characteristic lift amount detected by the sensor.

17. The internal combustion engine of claim 14, wherein the variable valve mechanism control device is adapted to control the actuator to vary the characteristic lift amount within the sub-range of the specified range during the error operation mode based on an engine revolution count.

18. A variable valve mechanism control device, comprising:
- a first variable valve mechanism for a first internal combustion engine intake valve or exhaust valve, wherein a characteristic lift amount of the first variable valve mechanism is continuously variable within a specified range;
- a first actuator to drive the first variable valve mechanism;
- a first sensor to detect the current characteristic lift amount being set by the first actuator in the first variable valve mechanism;
- a second variable valve mechanism for a second internal combustion engine intake valve or exhaust valve, wherein a characteristic lift amount of the second variable valve mechanism is continuously variable within the specified range;
- a second actuator to drive the second variable valve mechanism;
- a second sensor to detect the current characteristic lift amount being set by the second actuator in the second variable valve mechanism; and
- a variable valve mechanism control device adapted to control each actuator to vary the characteristic lift amount of the first and second variable valve mechanisms within the specified range during a normal operation mode; and
- wherein the variable valve mechanism control device is adapted to store a learned value related to the first and second sensors at a target value for current engine operating conditions during normal operation and to control the second actuator to vary the characteristic lift amount of the second variable valve mechanism within a sub-range of the specified range during an error operation mode when an error occurs in the second sensor based on at least the learned value and a first command value for the first actuator.

19. The variable valve mechanism control device of claim 18 wherein the learned value is a learned deviation value between the first and second sensors at the target value; and
- wherein the variable valve mechanism control device is adapted to control the second actuator to vary the characteristic lift amount of the second variable valve mechanism within the sub-range of the specified range during the error operation mode based on the target value, the learned deviation value and the first command value.

20. The variable valve mechanism control device of claim 18 wherein the learned value is a learned ratio value between the target value and a ratio of the first and second sensor current characteristic lift amount outputs during normal operation; and wherein the variable valve mechanism control device is adapted to control the second actuator to vary the characteristic lift amount of the second variable valve mechanism within the sub-range of the specified range during the error operation mode based on the target value, the learned ratio value and the first command value.

21. A variable valve mechanism control method for at least a first and a second variable valve mechanism for a respective internal combustion engine intake valve or exhaust valve, each mechanism having an actuator to drive the mechanism such that it has a valve lift characteristic value that is continuously changeable within a specified variable range and a sensor for obtaining a detection value for the valve lift characteristic value, the method comprising:

calculating a target value within the specified variable range of valve lift characteristic values based on engine operating conditions;

outputting a first command value to a first actuator based on the target value and a detection value at the target value for the engine operating conditions during normal operation;

storing a learned value related to the detection value of the first variable valve mechanism at the target value for the engine operating conditions during normal operation and to a detection value of the second variable valve mechanism at the target value for the engine operating conditions during normal operation; and outputting a second command value to the second actuator when an error is identified in a second sensor of the second variable valve mechanism, wherein the second command value is within a sub-range of valve lift characteristic values and is based on at least the target value and the learned value.

22. The method of claim 21 wherein the learned value is a learned deviation value between the detection value of the first variable valve mechanism and the detection value of the second variable valve mechanism; and wherein the second command value is based on the target value, the learned deviation value and the first command value.

23. The method of claim 21 wherein the learned value is a learned ratio value between the detection value of the first variable valve mechanism and the detection value of the second variable valve mechanism; and wherein the second command value is based on the target value, the learned ratio value and the first command value.

* * * * *